United States Patent
McCaslin et al.

(10) Patent No.: US 9,106,105 B2
(45) Date of Patent: Aug. 11, 2015

(54) REGULATION OF INVERTER DC INPUT VOLTAGE IN PHOTOVOLTAIC ARRAYS

(75) Inventors: Shawn R. McCaslin, Austin, TX (US); Sam B. Sandbote, Sunnyvale, CA (US); Bertrand J. Williams, Austin, TX (US)

(73) Assignee: Draker, Inc., Austin, TX (US)

( * ) Notice: Subject to any disclaimer, the term of this patent is extended or adjusted under 35 U.S.C. 154(b) by 764 days.

(21) Appl. No.: 13/362,214

(22) Filed: Jan. 31, 2012

(65) Prior Publication Data

US 2012/0205974 A1   Aug. 16, 2012

Related U.S. Application Data

(60) Provisional application No. 60/441,585, filed on Feb. 10, 2011.

(51) Int. Cl.
*H02J 3/38* (2006.01)
(52) U.S. Cl.
CPC ............... *H02J 3/385* (2013.01); *Y02E 10/58* (2013.01); *Y10S 323/906* (2013.01)
(58) Field of Classification Search
None
See application file for complete search history.

(56) References Cited

U.S. PATENT DOCUMENTS

| | | | |
|---|---|---|---|
| 7,158,395 B2 | 1/2007 | Deng et al. | |
| 7,466,571 B2 * | 12/2008 | Deng et al. | 363/49 |
| 7,768,155 B2 | 8/2010 | Fornage | |
| 7,859,241 B2 | 12/2010 | Yoshida et al. | |
| 8,053,929 B2 * | 11/2011 | Williams et al. | 307/82 |
| 8,093,756 B2 * | 1/2012 | Porter et al. | 307/72 |
| 8,482,947 B2 * | 7/2013 | Chapman et al. | 363/71 |
| 8,576,591 B2 * | 11/2013 | Phadke | 363/65 |
| 2007/0221267 A1 | 9/2007 | Fornage | |
| 2008/0150366 A1 | 6/2008 | Adest et al. | |
| 2008/0203994 A1 | 8/2008 | Park | |
| 2009/0160258 A1 | 6/2009 | Allen et al. | |
| 2009/0189574 A1 | 7/2009 | Le et al. | |
| 2009/0284078 A1 * | 11/2009 | Zhang et al. | 307/82 |
| 2010/0026097 A1 * | 2/2010 | Avrutsky et al. | 307/43 |
| 2011/0215778 A1 * | 9/2011 | Chen | 323/267 |

OTHER PUBLICATIONS

"Maximum power point tracker," Wikipedia, the free encyclopedia, http://en.wikipedia.org/wiki/Maximum_power_point_tracker, 2 pages. [Retrieved Nov. 17, 2008].

(Continued)

*Primary Examiner* — Rexford Barnie
*Assistant Examiner* — David Shiao
(74) *Attorney, Agent, or Firm* — Meyertons Hood Kivlin Kowert & Goetzel, P.C.; Jeffrey C. Hood

(57) ABSTRACT

A converter unit configured to couple to a photovoltaic panel (PV) may include a controller to sense an output voltage and output current produced by the photovoltaic panel, and manage the output voltage of a corresponding power converter coupled to a DC bus to regulate the resultant bus voltage to a point that reduces overall system losses, and removes non-idealities when the panels are series connected. The controller may also adapt to output condition constraints, and perform a combination of input voltage and output voltage management and regulation, including maximum power point tracking (MPPT) for the PV. The output voltage and output current characteristic of the power converter may be shaped to present a power gradient—which may be hysteretically controlled—to the DC bus to compel an inverter coupled to the DC bus to perform its own MPPT to hold the DC-bus voltage within a determinate desired operating range.

35 Claims, 16 Drawing Sheets

(56) References Cited

OTHER PUBLICATIONS

"New Solar Panels," Solar Power, http://www.otherpower.com/otherpower_solar_new.html, 4 pages. [Retrieved Nov. 17, 2008].

Kasemsan Sid and Kenneth A. Conner, "Sequentially Controlled Distributed Solar-Array Power System with Maximum Power Tracking," IEEEAC paper #1001, Version 3, Updated Sep. 30, 2003, 9 pages.

Kasemsan Siri and Kenneth A. Conner, "Parallel-Connected Converters with Maximum Power Tracking," The Aerospace Corporation, Electrical and Electronic systems Department, 2002, 7 pages.

Yan Hong Lim and D.C. Hamill, "Simple maximum power point tracker for photovoltaic arrays," Electronic Letters, vol. 36, No. 11, May 25, 2000, 2 pages.

Windy Dankoff, "Increase Solar Charging with an MMPT Power Tracking Charge Controller," What is MPPT? Explanation of maximum power point tracking, http://www.wholesalesolar.com/Wind/MPPT-article.html, 2 pages. [Retrieved Nov. 17, 2008].

W. Stephen Woodward, "Maximum-Power-Point-Tracking Solar Battery Charger," Electronic Design, Sep. 14, 1998, pp. 114-118.

* cited by examiner

960

```
If (Vout > 50V) {                              ⎫
    // Output-only regulation                   ⎬ Out of Bounds
    VinWeight = 0;                              ⎭
    VoutWeight = 1.0;
} else if (Vout > 30V) {                       ⎫
    // Hybrid weighted input-output regulation  ⎬ High Range
    Vinweight = 0.5;                            ⎭
    VoutWeight = 0.5;
} else if (Vout > 20V) {                       ⎫
    // Input-only regulation                    ⎬ Preferred Range
    Vinweight = 1.0;                            ⎭
    VoutWeight = 0;
} else {                                       ⎫
    // Hybrid weighted input-output regulation  ⎬ Low Range
    Vinweight = 0.5;                            ⎭
    VoutWeight = 0.5;
}
```

```
If (Vout > Cp*Vcred) {
    // Output-only regulation
    setVout (Cp*Vcred);
    Cp = Cp + RequestCredit () ;
} else }
    // Input-only regulation
    ExcessiveVoltage = Vout - Cp*Vcred;
    Cp = Cp - GiveUpExcessCredit (ExcessVoltage/Vcred) ;
}
```

FIG. 14

```
                                                    2200 param voltage Vprobe;    // amplitude of probe waveform
param voltage Vstep;     // incremental up/down voltage adjustment voltage Vmpp;      // steady-state source voltage power Phi, Plo;    // source power levels at 2 probe points
power Pdiff;       // differential power loop forever {

// Probe power at lower voltage
   // Source is at steady-state voltage Vmpp
   measure power Plo;

// Probe power at higher voltage
   change source voltage to (Vmpp + Vprobe);
   measure power Phi;

// Compute differential power
   pDiff = Phi - Plo;
   if (Pdiff > 0) {
      // Power is greater at higher voltage
      set Vmpp = Vmpp + Vstep;
   } else {
      // Power is greater at lower voltage
      set Vmpp = Vmpp - Vstep;
   }

// Move the computed max power point
   change source voltage to Vmpp;

······· Push down
-·-·- Push up
—— Do nothing

REGULATION OF INVERTER DC INPUT VOLTAGE IN PHOTOVOLTAIC ARRAYS

PRIORITY CLAIM AND INCORPORATION BY REFERENCE

This application claims benefit of priority of U.S. Provisional Application Ser. No. 61/441,585 titled "Regulation of Inverter DC Input Voltage, Pseudo Random Bit Sequence Generation for MPPT, and Dynamic Frequency and PWM of Dual-Mode Switching Power Controllers in Photovoltaic Arrays", filed Feb. 10, 2011, and whose inventors are Shawn R. McCaslin, Sam B. Sandbote, and Bertrand J. Williams, and which is hereby incorporated by reference in its entirety as though fully and completely set forth herein.

BACKGROUND OF THE INVENTION

1. Field of the Invention

This invention relates generally to the field of photovoltaic arrays, and more particularly to the regulation of DC input voltage of an inverter coupled to the DC-voltage bus of a photovoltaic array.

2. Description of the Related Art

Photovoltaic arrays (more commonly known and referred to as solar arrays) are a linked collection of solar panels, which typically consist of multiple interconnected solar cells. The modularity of solar panels facilitates the configuration of solar (panel) arrays to supply current to a wide variety of different loads. The solar cells convert solar energy into direct current electricity via the photovoltaic effect, in which electrons in the solar cells are transferred between different bands (i.e. from the valence to conduction bands) within the material of the solar cell upon exposure to radiation of sufficient energy, resulting in the buildup of a voltage between two electrodes. The power produced by a single solar panel is rarely sufficient to meet the most common power requirements (e.g. in a home or business setting), which is why the panels are linked together to form an array. Most solar arrays use an inverter to convert the DC power produced by the linked panels into alternating current that can be used to power lights, motors, and other loads.

The various designs proposed and developed for solar arrays typically fall into one of two configurations: a low-voltage configuration (when the required nominal voltage is not that high), and a high-voltage configuration (when a high nominal voltage is required). The first configuration features arrays in which the solar panels are parallel-connected. The second configuration features solar panels first connected in series to obtain the desired high DC voltage, with the individual strings of series-connected panels connected in parallel to allow the system to produce more current. Various problems have been associated with both configurations, with the most prolific array configuration being the high-voltage series-string based configuration. The series-string configuration raises the overall distribution DC-bus voltage level to reduce resistive losses. However, in doing so it increases panel mismatch losses by virtue of the series-string being limited by the weakest panel in the string. In addition, the resultant DC-bus voltage has a significant temperature and load variance that makes inversion from DC to AC more difficult. Consequently, many design efforts have been concentrated on improving the efficiency of the collection of electrical power from the array, by mitigating these non-idealities.

Various designs have been proposed and developed for DC/DC (DC-to-DC) converter systems applied to solar arrays. Most of these designs have concentrated on the implementation of Maximum Power Point Tracking (MPPT), which employs a high efficiency DC/DC converter that presents an optimal electrical load to a solar panel or array, and produces a voltage suitable for the powered load. Oftentimes the DC/DC converters are implemented with a switching regulator in order to provide highly efficient conversion of electrical power by converting voltage and current characteristics. Switching regulators typically employ feedback circuitry to monitor the output voltage and compare it with a reference voltage to maintain the output voltage at a desired level. While typical regulation may be satisfactory in most applications, when operating DC/DC converters with photovoltaic/solar panels, the requirements associated with such arrays present additional problems that typical regulation cannot adequately address.

Many other problems and disadvantages of the prior art will become apparent to one skilled in the art after comparing such prior art with the present invention as described herein.

SUMMARY OF THE INVENTION

In one set of embodiments, a converter module may include a control module and a power controller, with inputs of the power converter coupled to a solar panel, and outputs of the power converter coupled to a DC voltage bus. The control module may control the power converter to provide a desired output voltage and an output current to a DC voltage bus. A photovoltaic (PV) array, or solar array, may include a respective control module coupled to each PV panel (or solar panel), and the converter modules may be wired in series. The control module may include a number of input ports, each given input port capable of receiving a different one of a number of parameters that include a first parameter indicative of an input current of the power converter provided by the solar panel, a second parameter indicative of an input voltage of the power converter provided by the solar panel, a third parameter indicative of an output voltage of the power converter, and a fourth parameter indicative of an output current of the power converter. The control module may further include a controller implementing a maximum power point tracking (MPPT) algorithm and an output power control algorithm, each using the first, second, third, and fourth parameters as input values, to regulate the input voltage, input current, output voltage, and output current of the power converter. In implementing the output power control algorithm, the controller may adjust an output power versus output voltage characteristic of the power converter.

The control module may provide one or more control signals to the power converter to control the power converter, and may determine the respective values of the one or more control signals according to the MPPT algorithm, the output power control algorithm, and the input values used by the MPPT algorithm and the output power control algorithm. In one set of embodiments, the controller may adjust the input voltage, input current, output voltage, and output current of the power converter to present a power gradient to an inverter coupled to the DC voltage bus, to compel the inverter to hold an overall voltage of the DC voltage bus within a target operating range, while minimizing a corresponding system efficiency loss. The control module may center the power gradient on a present value of the overall voltage of the DC voltage bus, with the sign of the slope of the power gradient determining a desired direction of the movement of the overall voltage of the DC voltage bus. Furthermore, the controller may choose a slope for the power gradient that results in the overall voltage of the DC voltage bus moving towards a target voltage, and may no longer present the power gradient to the inverter once the overall voltage of the DC voltage bus is within the target operating range. In some embodiments, the control module may receive external control directives that provide the values for the target operating range for the overall voltage of the DC voltage bus.

In one set of embodiments, a control system may be operated to control a power converter coupled to a solar panel to provide an output voltage and output current to a voltage bus residing at an overall bus voltage. The overall bus voltage on the voltage bus may be generated by a number of power converters connected in series. For each power converter, the control system may include a sensing circuit for sensing the input current and the input voltage of the power converter derived from the solar panel, and also for sensing the output voltage and the output current of the power converter. For each power converter, the control system may also include a controller for regulating the input voltage of the power converter according to the sensed input current and sensed input voltage of the power converter and according to the sensed output voltage and sensed output current of the power converter, to optimize power derived from the solar panel. The controller may also execute an output power control algorithm to compel an inverter coupled to the voltage bus to track the overall bus voltage to maintain the overall bus voltage within an overall bus voltage range to ensure that the overall bus voltage is at a determinate preferred value.

In one sense, the controller may regulate output power of the power converter to effect a shaped power transfer characteristic that contains localized power gradients on the voltage bus. Furthermore, the controller may apply the localized power gradients transiently, and synchronize the localized power gradients to an MPPT probe signal applied to the voltage bus by the inverter. The controller may track, over a time period of specific duration, the minimum and maximum voltage output values for the output voltage of the power converter, and upon expiration of the time period identify a peak minimum voltage output value and a peak maximum voltage output value, and control a timing and slope of the localized power gradients according to the peak minimum voltage output value and the peak maximum voltage output value. The controller may compute output voltage threshold values based on the peak minimum voltage output value and the peak maximum voltage output value, and control the timing and the slope of the localized power gradients according to the computed output voltage threshold values.

In one set of embodiments, the controller may determine an average value of the output voltage of the power converter, and compare the average value of the output voltage against the computed output voltage threshold values for controlling the timing and the slope of the localized power gradients, to provide hysteretic control of the localized power gradients. Thus, the controller may be operated to activate a first (e.g. DOWN) state upon the average value of the output voltage rising above a highest threshold of the computed output voltage threshold values, and maintain the DOWN state until the DOWN state is released. The controller may release the DOWN state upon the average value of the output voltage falling below a middle lower threshold of the computed output voltage threshold values. The controller may likewise activate a second (e.g. UP) state upon the average value of the output voltage falling below a lowest threshold of the computed output voltage threshold values, and maintain the UP state until the second state is released. The controller may eventually release the UP state upon the average value of the output voltage rising above a middle upper threshold of the computed output voltage threshold values. Accordingly, the controller may present a negative power-versus-output-voltage gradient to the voltage bus when the DOWN state is active and the output voltage becomes greater than the average value of the output voltage, and may present a positive power-versus-output-voltage gradient to the voltage bus when the UP state is active and the output voltage becomes lower than the average value of the output voltage.

To regulate the input voltage of the power converter, the controller may execute an MPPT algorithm, that includes measuring a first output power of the power converter at a first value of the input voltage representative of a target input voltage value, and measuring a second output power of the power converter at a second value of the input voltage representative of a present input voltage value. If the measured second output power is greater than the measured first output power, the controller may increase the target input voltage value by a first amount if the second value is greater than the first value, and decrease the target input voltage value by a second amount if the second value is less than the first value. If the measured second output power is less than the measured first output power, the controller may decrease the target input voltage value by a third amount if the second value is greater than the first value, and increase the target input voltage value by a fourth amount if the second value is less than the first value. As also part of the MPPT algorithm, the controller may subsequently generate a new first value of the input voltage and a new second value of the input voltage. In some embodiments, the controller may algorithmically determine the first amount, second amount, third amount, and fourth amount.

BRIEF DESCRIPTION OF THE DRAWINGS

The foregoing, as well as other objects, features, and advantages of this invention may be more completely understood by reference to the following detailed description when read together with the accompanying drawings in which:

FIG. 13 shows a pseudo-code implementation of one embodiment of the control function shown in FIG. 10, with static constraints;

FIG. 14 shows a pseudo-code implementation of one embodiment of $F(V_o)$ of the control function shown in FIG. 10, with dynamic constraints;

FIG. 22 shows one embodiment of a generic MPPT algorithm, with an additional setpoint.

Figure 1:
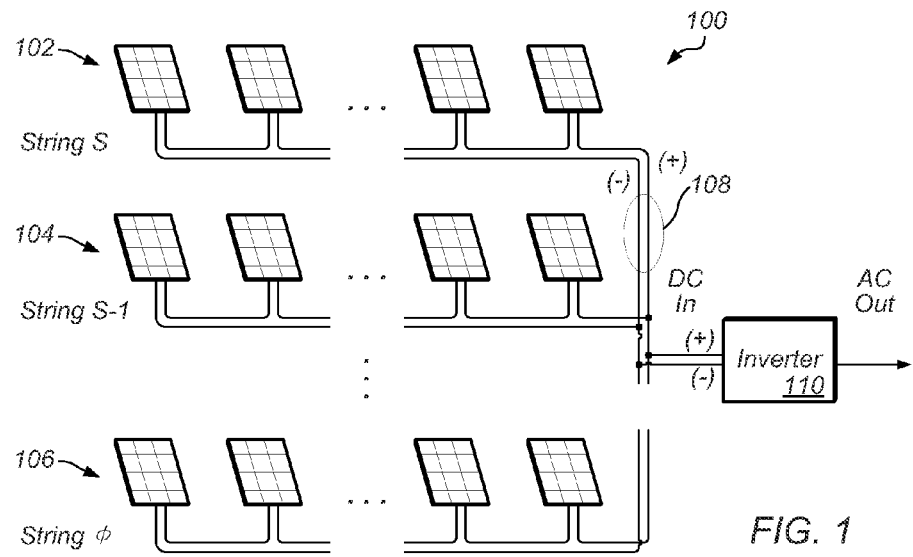
FIG. 1 shows an example diagram of a conventional series-string and parallel branch solar array configuration.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

In solar array systems, many non-idealities may be mitigated by utilizing distributed Maximum Power Point Tracking (MPPT). Distributed MPPT usually includes insertion of a DC/DC converter or a similar power converter behind solar panels in the array, most commonly behind each and every solar panel in the array, to adapt the coupled solar panel's power transfer onto a high-voltage bus (typically a high-voltage DC bus) which connects the panels together via the DC/DC converters. A typical solar array 100 is shown in FIG. 1. Solar panel series-strings 102, 104, and 106 are coupled in parallel to bus 108, which may be a DC/DC bus. Each solar panel series-string includes solar panels coupled in series to a respective bus, each of those respective buses coupling to bus 108 as shown to obtain parallel-coupled solar panel series-strings. An inverter 110 is coupled to bus 108 to ultimately drive a connected load, which may be coupled to the output of inverter 110.

Figure 3:
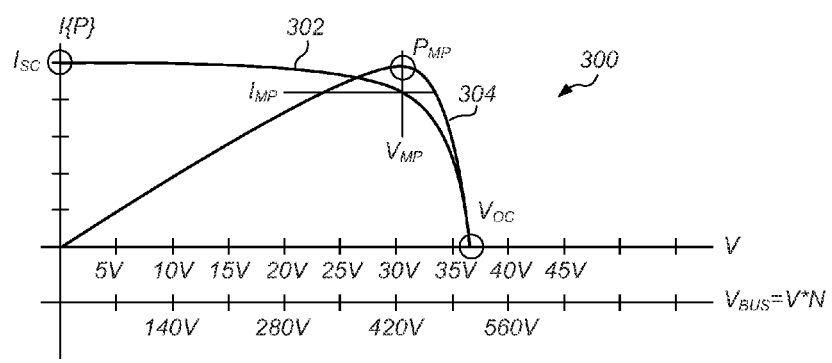
FIG. 3 shows an example V/I power curve for a series-string solar array configuration.

An example of the V/I (voltage/current) characteristic for each solar panel is shown in FIG. 3. As seen in FIG. 3, the V/I characteristic may be modeled as a current source in parallel with a multiplied shunt diode, where the current is proportional to the solar insolation levels, and the shunt diode is the result of the solar cell diode in each cell multiplied by the number of cells in series which make up that solar panel. Curve 302 represents the V/I curve, that is, the current I output by the solar panel (represented on the vertical axis) for a given output voltage V (represented on the horizontal axis). Curve 304 represents the power curve associated with V/I curve 302, showing the maximum power point $P_{MP}$, that is, the point at which the product of the current and voltage output by the solar panel is at its maximum. These values are indicated as $I_{MP}$ and $V_{MP}$, respectively, and $I_{MP}*V_{MP}=P_{MP}$. $V_{OC}$ indicates the open circuit voltage output by the solar panel, that is, the voltage output by the solar panel when not providing current to a load. Similarly, $I_{SC}$ indicates the short circuit current output by the solar panel, that is, the current output by the solar panel with its output terminals shorted together. $V_{BUS}$ indicates the total voltage that appears on the bus for N solar panels connected in the series-string.

Figure 4:
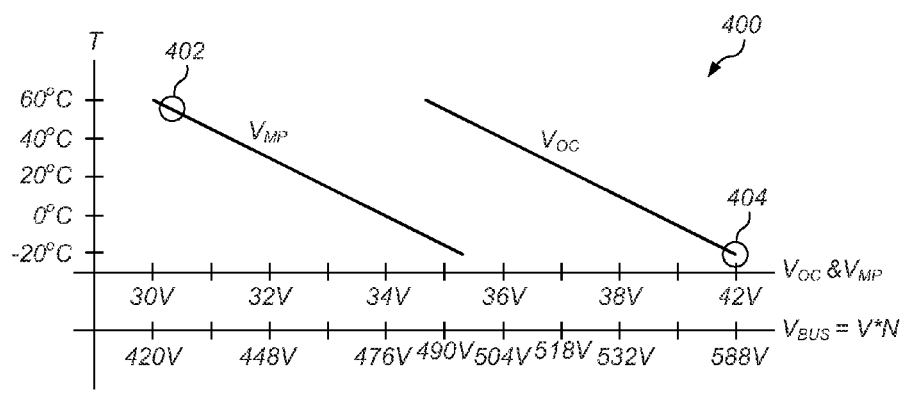
FIG. 4 shows an example $V_{OC}$ & $V_{MP}$ vs. temperature curve for a typical solar panel.

Turning now to FIG. 4, the open circuit voltage $V_{OC}$ of the solar panel may be set by the current—generated as a result of solar insolation—shunted by the series multiplied diode elements. As determined by the shunt diodes within the cell, this voltage may exhibit temperature variance similar to a silicon diode junction. The $V_{OC}$ for a solar panel may thus increase with decreasing temperature, and vice-versa, as indicated by the $V_{OC}$ curve shown in FIG. 4. Consequently, in order for the maximum bus voltage (maximum $V_{BUS}$) to comply with NEC (National Electrical Code) standards, the number of solar panels that may be connected in series at a given site needs to be determined based on the expected coldest temperature at that site. The bus specification usually limits the maximum value of $V_{BUS}$ to 600V in a US NEC compliant system. It should also be noted that at high temperatures, and while under load, the bus voltage may be substantially lower than the allowed operating level for the Bus. Point 402 on the $V_{MP}$ curve indicates the typical $V_{MP}$ condition, and point 404 on the $V_{OC}$ curve indicates a typical $V_{OC}$ condition.

Use of a properly designed respective adaptive DC/DC converter coupled to each solar panel in a solar panel array allows for modification of the curves shown in FIG. 4, under algorithmic control of the DC/DC converters. In order to calculate how many panels may be placed in series, the following equation may be used:

$$N = \text{Integer}(V_{BUS\text{-}max}/V_{OC\text{-}p}), \quad (1)$$

where $V_{BUS\text{-}max}$ is the maximum value of $V_{BUS}$, e.g. 600V when observing NEC standards, and $V_{OC\text{-}p}$ is the maximum value of $V_{OC}$ for any given panel utilized in the array, at the minimum site location temperature. For example, if $V_{BUS\text{-}max}=600V$, and $V_{OC\text{-}p}=42V$:

$$N = \text{Integer}(600V/42V) = \text{Integer}(14.28) = 14. \quad (2)$$

Therefore, 14 panels of this type may normally be placed in series for a cold temperature $V_{BUS\text{-}OC} = \sim 14 * 42V = 588V$. According to the V/I curve 402, which corresponds to high temperature and operation at the maximum power point, in FIG. 4, $V_{MP}$ at 45° C. is close to 30.5V, resulting in a bus voltage value of $V_{BUS} = \sim 14 * 30.5V = 427V$ under normal operating conditions for this example.

During normal operation, each panel may therefore contribute ~32V to the total bus voltage for the solar panel array string under. Assuming a case of shading, damage, or extreme mismatch, which may result in a given percentage of the solar panels in each string not providing normal power, the $V_{MP}$ bus voltage level may decrease by the amount that the given percentage of the solar panels fails to provide. For example, 20% of the solar panels in a given series-string failing to function normally may lead to a normal operating voltage of the series-string of $V_{BUS} * \sim 80\% = 358V$, which represents a substantial drop. If other series-strings (of solar panels) maintain the bus voltage at $V_{BUS} = 448V$ under normal conditions, the given series-string may produce no power at all, and may come close to act as a shunt diode load on the high-voltage DC bus (e.g. bus 108 shown in FIG. 1).

In this example, to design a DC/DC converter unit to isolate the panel voltage from the Bus voltage to alleviate the problem, the desired operating points may be specified by determining the number of panels, and thus converter modules, to be connected in series. For $V_{BUS\text{-}MAX}$ (i.e. maximum bus voltage) conditions, each converter module may be limited to $V_{O\text{-}MAX} = 600V/14 = 42.85V$, comparable to the panel $V_{OC}$, that is, $V_{OC\text{-}p}$. Furthermore, each module may be operated sufficiently below this level, to ensure that when a specified percentage (e.g. 15%) of the number of the solar panels are dysfunctional, the remaining modules may successfully boost up their voltage, staying below $V_{O\text{-}MAX}$, to compensate for lost voltage in that string. In the specific example provided, the preferred output operating voltage for each DC/DC converter module may thus be expressed as:

$$V_{O\text{-}nom} \leq (12/14 * 42.85V) \leq 36.7V, \text{and thus}, \quad (3)$$

$$V_{BUS} = 36.7V * 14 = 513.8V, \text{normally}. \quad (4)$$

More generally, the nominal output voltage for each solar panel may be determined by dividing the number of functioning panels by the total number of panels in the series-string, and multiplying the result by the maximum output voltage of each solar panel. In this example, the bus voltage at the normal operating point may be improved by 15%, reducing the DC bus losses by ~32%. The resulting system may therefore become tolerant of two panels in each string becoming non-functional, fully or partially, while maintaining power from the other panels. In cases of less than fully non-functional operation, many of the panels may be degraded substantially for the same recovery level.

Figure 2A:
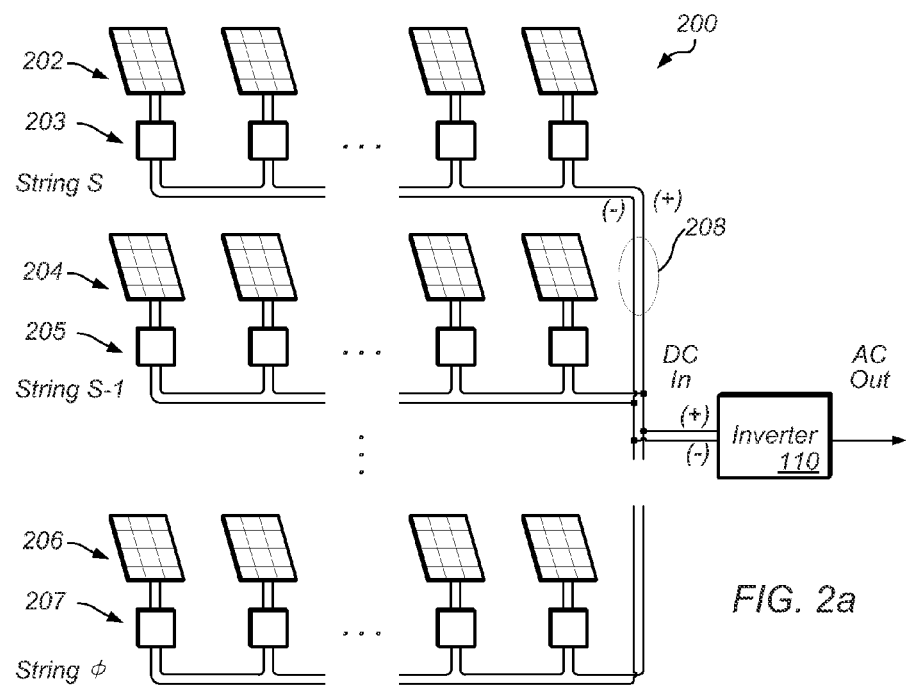
FIG. 2a shows an example of a series-string solar array configuration retrofitted with DC/DC converters attached to the solar panels.
Figure 5:
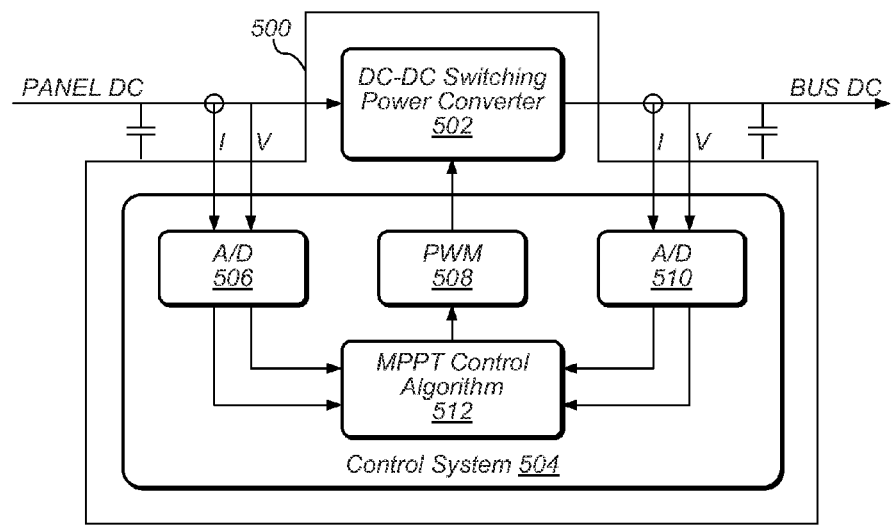
FIG. 5 shows an example Architecture for a direct MPPT controlled DC/DC Converter.

Maximum Power Point Tracking:

FIG. 2a shows one embodiment of a system 200 featuring solar panel series-strings 202, 204, and 206, with each of solar panels 202, 204, and 206 coupled to a respective power converter unit of power converter units 203, 205, and 207, respectively. In this case, power converter units 203, 205, and 207 may each include a control unit and a power converter controlled by the control unit, and providing a voltage for the respective bus to which the given string is coupled, with the buses coupling to bus 208 in parallel as shown. Thus, respective outputs of the power converters and controllers 203 are series coupled to high voltage DC bus for String S, the respective outputs of the power converters and controllers 205 are series coupled to high voltage DC bus for String S-1, and the respective outputs of the power converters and controllers 207 are series coupled to high voltage DC bus for String F, with the three buses parallel coupled to high voltage DC bus 208. Inverter 110 may be coupled to bus 208 in system 200, to drive a connected load(s). For the sake of clarity, each power converter and controller will be referred to herein simply as a "converter unit", with the understanding that each converter unit may include a power converter, e.g. a DC/DC switching converter, and all associated control circuitry/unit, e.g. functional units to perform MPPT. Each of the attached converter units 204 may be designed to execute a control algorithm, which may exercise control over a switching power conversion stage. The internal structure of one embodiment of a typical converter unit 500 is shown in the block diagram of FIG. 5. Converter unit 500 may include a control system 504 implementing a single control loop to perform MPPT control of switching converter 502. The input voltage and input current from the solar panel may be sensed and sampled by A/D converter 506, and the output voltage and output current from switching converter 502 may be sensed and sampled by A/D converter 510. These sampled values may be processed using control algorithm 512 to calculate the power, and the duty-cycle of the switching signal provided to switching converter 502. For example, control algorithm 512 may be implemented in hardware, it may be implemented as instructions executed by a microcontroller/processor, or as a combination of both, and may use the sampled values directly to produce the required PWM signal 508 to achieve the conversion characteristics that maintain the solar panel at its maximum power point. It should also be noted, that analog implementation of control system 504 is possible and contemplated, in which case A/D converters 506 and 510 would not be required.

Figure 2B:
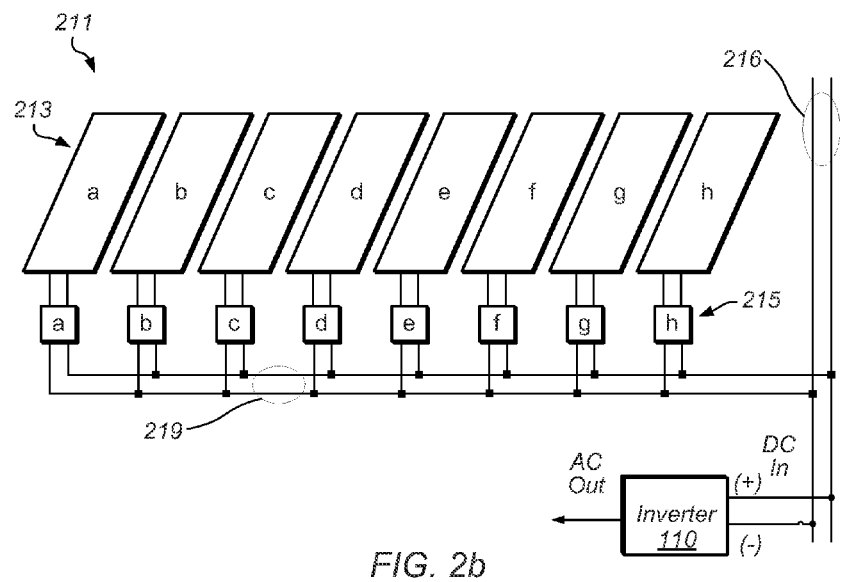
FIG. 2b shows an example of a parallel-string (parallel connected) solar array configuration with DC/DC converters attached to the solar panels.

In alternate embodiments, the respective outputs of the power converters and controllers 204 may be parallel coupled to high voltage DC bus 208, which may be coupled to high voltage DC bus 206. FIG. 2b shows one embodiment of a system 211 featuring a solar panel parallel-string 213, in which each of solar panels 213 a-h is coupled to a respective converter unit 215 a-h. Converter units 215 a-h may also each include a control unit and a power converter providing a voltage for bus 219, and controlled by the control unit. For example, panel 213a is coupled to converter unit 215a, panel 213b is coupled to converter unit 215b, and so on. The respective outputs of the power converters and controllers 215 are then parallel coupled to high voltage DC bus 219, which may be coupled to high voltage DC bus 216. Each of the attached converter units 215 may be designed to execute a control algorithm, which may exercise control over a switching power conversion stage. For a more detailed presentation, please refer to U.S. patent application Ser. No. 12/314,050, fully incorporated herein by reference. Possible embodiments of converter unit 205 are provided in FIG. 5 and FIG. 7. Again, an inverter 110 may be coupled to bus 216 in system 211, to provide AC power to a connected load(s).

Many algorithms currently exist for determining and maintaining MPPT operation in a system such as system 200, including Hill Climbing, Zero Derivative, Fuzzy Logic, etc. While such algorithms are applicable to these systems, each has its own advantages and disadvantages. The choice of algorithm type may be determined by a compromise of dynamic tracking characteristics, precision, and/or tracking bandwidth against desired results. Most algorithms may be considered equivalent of each other and equally applicable to a static system. Dynamic conditions typically occur during variable cloud shading and similar events, where the characteristics of the solar panel connected to the converter unit, as well as all of the other solar panels in the string may be affected rapidly. Under these conditions, converter units, such as converter unit 500 shown in FIG. 5, may not be able to provide a satisfactory response time. In one set of embodiments, a novel converter unit may implement a fast algorithm to track the dynamic conditions, and a slow algorithm to maintain accuracy and precision of the MPPT operating point. In some embodiments, an MPPT algorithm may include a pseudo-random sequence, which may be encoded to provide a DC balance, such that the resulting voltage probe at the input port has improved tracking and dynamic response.

Dual-Loop Fast Tracking MPPT:

Possible responses of the converter unit may be categorized as falling into one of two basic categories: a response to provide accurate MPPT, and a response to meet the needs for fast adaptive tracking One solution may be derived from the unique characteristics of the solar panel V/I curve during most fast transients. A typical transient under consideration might be a cloud passing over the solar panels, producing a variable insolation level transient.

Figure 6:
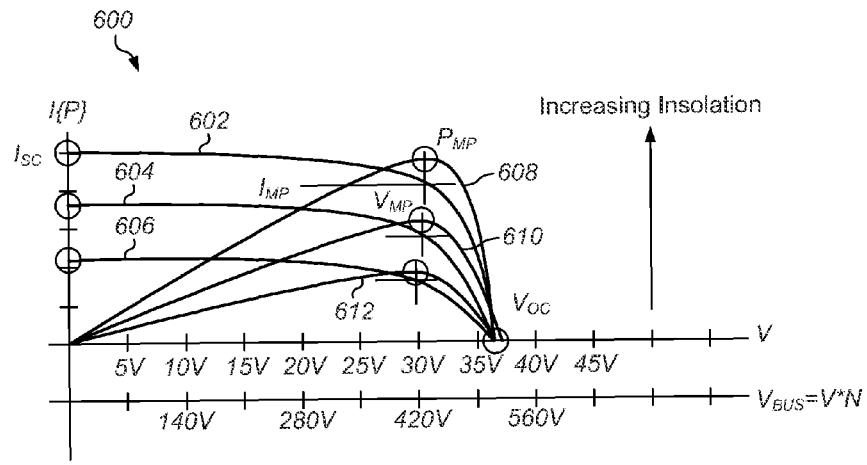
FIG. 6 shows an example V/I Curve for a typical solar panel at different insolation levels.

The graph 600 in FIG. 6 shows V/I curves for a given solar panel under three substantially different insolation levels. V/I curve 602 corresponds to a highest insolation level, V/I curve 604 corresponds to a lower insolation level, and V/I curve 606 corresponds to a lowest insolation level. Power curves 608, 610, and 612 in graph 600 are the power curves corresponding to V/I curves 602-606, respectively. As seen in graph 600, the current I generated by the solar panel is substantially reduced at lower insolation levels. In fact, it is typically the case that the current I is directly proportional to the insolation level. As a result, and as also seen in graph 600, the voltage at which MPPT is achieved remains substantially static, and varies very little over a transient of different insolation levels. In other words, the desired voltage $V_{MP}$ varies minimally, if at all, with respect to changing insolation levels. Consequently, early control systems for solar panels did not include a MPPT mechanism at all, but rather just operated the solar panel at a fixed voltage under all conditions, with the fixed voltage presumed to be near the desired MPPT voltage. However, such systems are not adaptive, and consequently cannot determine what the proper operating voltage for that given panel or string should be. Because of their lack of accuracy, the operation of such systems results in substantially reduced power transfer.

Figure 7:
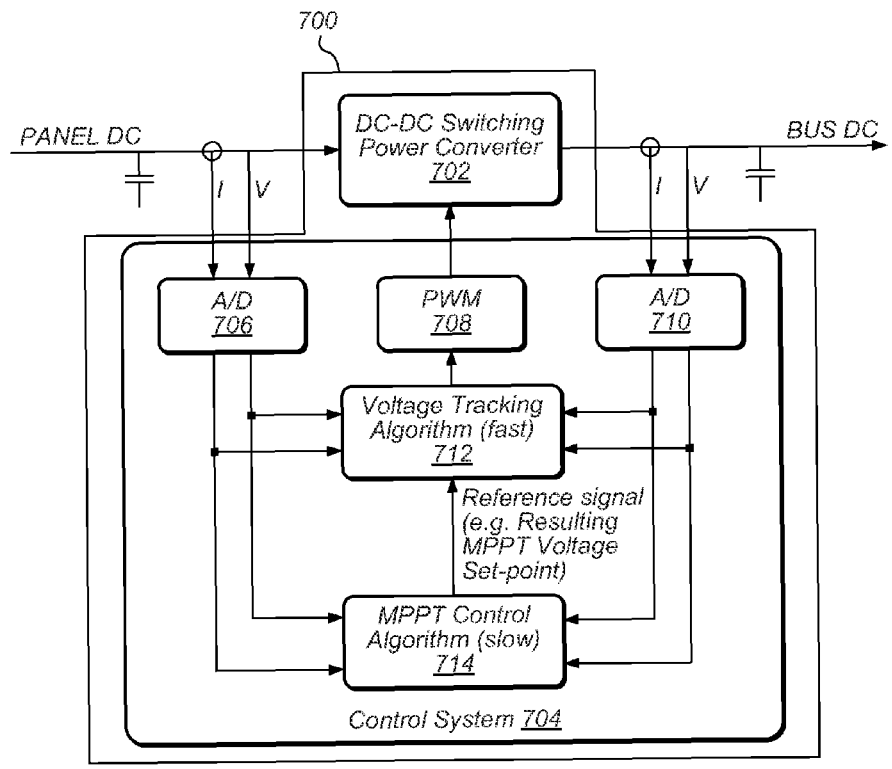
FIG. 7 shows one embodiment of a DC/DC converter controller that features an inner control loop regulating to $V_I$, and an outer MPPT control loop that sets the value for $V_I$.

One embodiment of an improved converter unit and method for achieving a fast response time together with accurate MPPT is shown in FIG. 7. Converter unit 700 may include a fast tracking inner control loop, which may be a fast tracking voltage regulating loop 712, and a slower MPPT tracking loop 714 utilized to set the "Reference" point for the inner control loop 712. In the embodiment shown, the Reference point is the reference voltage for the fast tracking inner control loop 712. The Reference point may be provided by MPPT loop 714 in the form of a control signal, whether analog or digital, to the inner voltage regulating loop 712, to determine what reference point (in this case reference voltage) the control system 704 should regulate to. The inner fast tracking loop 712 may directly control the DC/DC conversion duty-cycle of PWM control signal 708 for switching converter 702, and the outer MPPT loop 714 may continually monitor and average the power conditions to instruct the inner loop 712 what voltage value regulation should be performed to. Again, A/D converter 706 may be used to sense and sample the input voltage and current obtained from the solar panel, and A/D converter 710 may be used to sense and sample the voltage and current output by switching converter 702. However, in case of analog implementations, there is no need for A/D converters 706 and 710. Inner control loop 712 may be designed to monitor one or more of the input-ports (I and V received from the solar panel) and output-ports (I and V received from the output of power converter 702). Accordingly, converter unit 700 may include a total of four input ports, a first pair of input ports to receive input-port voltage and current from the solar panel, and a second pair of input ports to receive output-port voltage and current from power converter 702. It may also include an output port to provide the control signal to power converter 702 via PWM 708.

In one embodiment, fast tracking loop 712 may include a hardware PWM controller generating the PWM control signal 708 using analog and digital hardware functions, for a fully hardware-based control system. In another embodiment, fast tracking loop 712 include a microcontroller based system utilizing A/D and PWM peripherals implementing the fast tracking loop as a combination of hardware and firmware. Choices of embodiments including hardware and/or software implementations or a combination thereof may be based upon cost and performance criteria for the intended system while maintaining equivalence from an architectural perspective disclosed in at least FIG. 7.

MPPT algorithms typically use some form of dithering to determine a derivative of the Power vs. Voltage conditions, or to determine and maintain operation at the maximum power point. In converter unit 700, this dithering may now be performed by control system 704 dithering the reference signal (e.g. the resulting MPPT set-point, which may be an MPPT voltage set-point for regulating the input-port voltage, that is, the voltage input to A/D 706 and into converter 702) to the inner loop 712, rather than by directly modulating the duty-cycle of PWM signal 708. The advantages of the dual-loop structure in converter unit 700 include improved stability of the system, and very fast acquisition and tracking of the system during transients. Other advantages that may also be derived from the architectural partitioning into two control loops include current-mode operation of the inner Vin regulating control system, that is, current-mode operation of the inner control loop 712. Current-mode operation offers several advantages, including excellent tradeoff between stability and tracking speed, over-current protection and limiting, and automatic pulse-skipping during discontinuous-mode operation. Current-mode operation of fast tracking inner loop 712 may be particularly attractive, and easily enabled, when fast tracking inner loop 712 is implemented fully in hardware.

Regulation of Inverter DC Input Voltage

Method of Output Port Management

Figure 8:
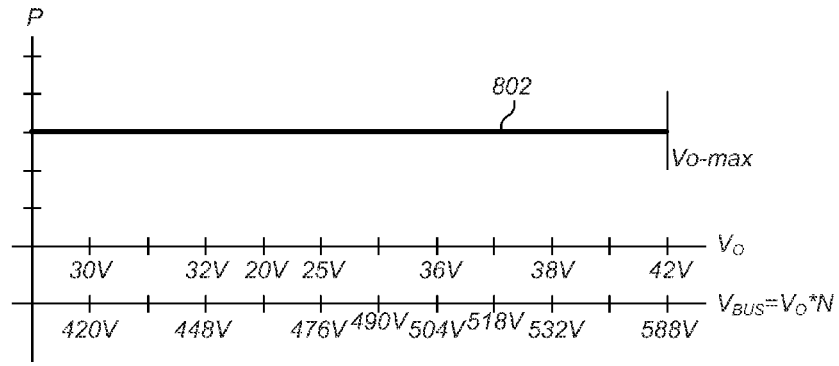
FIG. 8 shows an example power vs. $V_o$ and $V_{BUS}$ curve representing characteristics of a constant power port.

In one set of embodiments, a DC/DC switching power converter, such as converters 702 and/or 502, for example), may utilize pulse-based switching of devices connected to magnetic and capacitive elements to create a well controlled power transfer characteristic. The pulse timing may completely determine these transfer characteristics. In general DC/DC converters may be operated as constant-power-transfer devices, where $P_{out}=P_{in}$, (i.e. the output power equals the input power), minus the switching losses and/or other losses incurred in the converter. When a converter is configured to manage the input port, as the MPPT-based converters 500 and 700 may be configured, the output port power tracks the input port power, and the pulse-timing (of the PWM pulse 508 and 708, for example) may be adjusted to adapt to the required conditions at the input port and at the output port for transferring power to the load. This process may create a condition on the output port that causes the output port to operate as a "Virtual Power Port", or "Constant Power Port". In effect, no matter what voltage is established or impressed upon the output port, the power may be the same, as shown in the power vs. voltage diagram in FIG. 8. As indicated in FIG. 8, the power curve 802 may remain constant over output voltage and bus voltage variations, when operating the DC/DC switching converter according to an MPPT algorithm. In other words, the internal pulse-timing may be adjusted to produce the flat power curve 802 seen in FIG. 8. It is therefore important to consider what constrains or determines the bus voltage in a photovoltaic/solar array system.

In a conventional solar array that includes strings of panels, e.g. each string constructed of N panels, and M strings connected in parallel (e.g. as exemplified by array 100 in FIG. 1), the nominal string voltages determine what the value of the bus voltage ought to be for maximum power transfer of the array. Normally, for solar arrays, the inverter (such as inverter 110 in FIG. 1) incorporates MPPT tracking circuitry/mechanism designed to adjust the bus voltage to effect maximum power transfer from the array connected to the bus, as a whole. While each string may preferably be operated at different voltages to obtain maximum power transfer, it may not be possible to do so under a connected bus configuration, as the inverter may attempt to compromise the bus voltage to maximize overall power, if not optimal for a given string. If a DC/DC converter module is attached to each solar panel, as shown in FIGS. 2a and 2b for example, and the output port characteristics result in constant power over a wide range of DC bus voltages, the inverter may not properly track the bus voltage, and the resultant bus voltage may be indeterminate, or unlikely to reside at the desired level. If the DC/DC converter is designed to have a preferential conditioning placed upon its output port to set the preferred output port voltage within a desired range, then the inverter may detect the sum of these preferred operating voltages as the preferred bus voltage where maximum power is transferred from the array to the load.

To put it another way, the inverter connected to the bus may be operated with the expectation of a configuration shown in FIG. 1, where the power may peak at certain locations instead of remaining flat over the output voltage (bus voltage) range. Thus, the MPPT performed by the inverter is not expecting a flat power curve. However, the goal is to move the inverter to operate at a desired bus voltage. With the inverter performing MPPT without accounting for the presence of DC/DC converters between the bus and the solar panels, it may be therefore desirable to shape the power curve, putting emphasis on power vs. $V_{out}$ to allow the inverter to track to a specified voltage for maximum power transfer. In a way, the maximum power curve characteristic (shown in FIG. 3 for a single panel) may be "simulated" or "recreated" as the power characteristic with respect to the entire voltage bus, enabling the inverter to operate according to its MPPT algorithm without having to alter the inverter itself. This principle is illustrated in FIG. 9, which shows a modified power curve characteristic vs. the bus voltage, with three segments: a rising output voltage emphasis segment 902, a flat range segment 904, and a falling output voltage emphasis segment 906.

Figure 9:
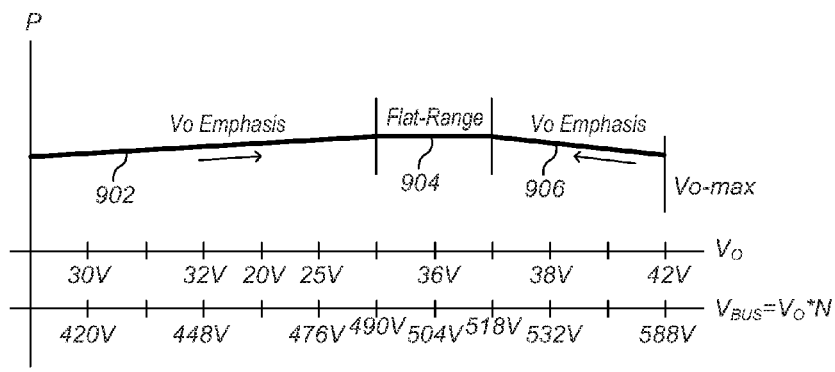
FIG. 9 shows an example power vs. $V_o$ and $V_{BUS}$ curve representing characteristics of a pseudo-constant power port with algorithmically controlled $V_o$ emphasis.
Figure 10:
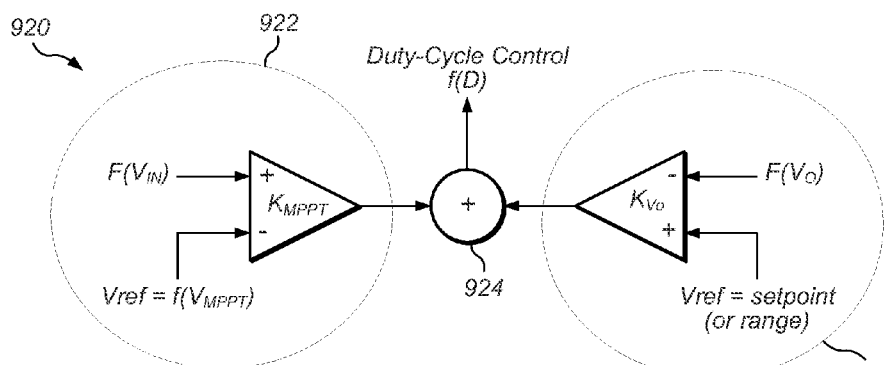
FIG. 10 shows an example of control function for implementation of a joint $V_{in}$ and $V_{out}$ regulation system.
Figure 11:
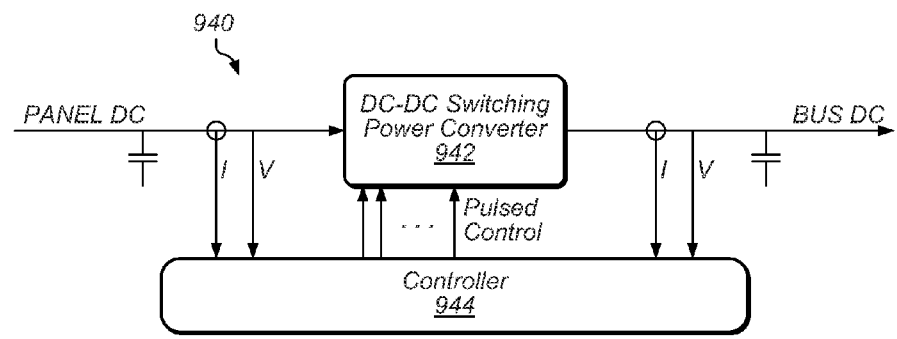
FIG. 11 shows a generalized DC/DC converter architecture.

Mathematically, the preferred output condition shown in FIG. 9 may be obtained by considering the output port as having a weak regulation component based on the output voltage. FIG. 10 shows a control diagram for one embodiment of a control function 920 for controlling the input and the output of a power converter (such as DC/DC power converters 500 and 700). The control function may be applicable and dual-port regulation may be performed when the power converters are series connected (as seen in FIGS. 1 and 2a) and/or parallel connected (as shown in FIG. 2b). As shown in FIG. 10, control function 920 may include two components 922 and 926 that combine to set the value of a control signal used in producing the output voltage of the power converter. In the embodiment shown, the control signal is a PWM signal, with function 920 setting the duty-cycle value of the PWM signal. Component 922 corresponds to the MPPT signal path $[K_{MPPT}*f(V_{MPPT})]$, which may be used to set the dominant pulse-timing, and component 926 corresponds to the output port voltage signal path $[K_{Vo}*f(V_O)]$, which may be used to establish a weak control path to provide "emphasis" (represented by 902 and 906 in FIG. 9) at the flat "Constant Power Port" around a preferred voltage range (represented by 904 in FIG. 9). In concept the emphasis range may be partitioned such that within some fairly narrow range, the power slope remains naturally flat (again, as exemplified by 904 in FIG. 9), and outside that range a gentle emphasis slope may be presented (again, as exemplified by 902 and 906 in FIG. 9) to cause a slight preferential tendency for the system to return to the nominal range, thus achieving the desired overall function. A typical DC/DC converter, such as converter 942 under control of controller 944 shown in FIG. 11, may possess a single input port and a single output port. Converter 942 may be implemented using capacitive, inductive, resistive, and switching components, controlled by pulsed inputs from controller 944. Controller 944 may regularly monitor voltage and current flow on the input and output ports of converter 942, and may control switching converter 942 through pulsed signals according to at least the monitored voltages and current flow. Controller 944 may be implemented in hardware, software, or a combination of both.

Figure 12:
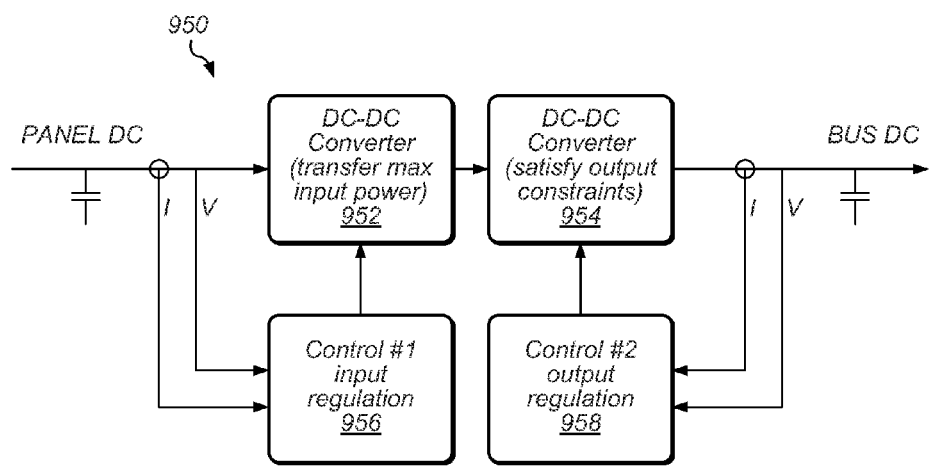
FIG. 12 shows a cascaded DC/DC converter architecture.

FIG. 12 shows one possible embodiment 950 for implementing control function 920 presented in FIG. 9. System 950 may include a cascade of two DC/DC converters, converters 952 and 954, each under control of a respective controller, 956 and 958, respectively. Converter 952 may collect power from a solar panel, constantly adapting to the panel's maximum power point under the control of controller 956. Converter 954 may receive voltage and current from converter 952, and may perform output regulation under control of controller 958 in order to satisfy the output constraints specified for controller 958. While cascaded system 950 satisfies both the desire to collect the maximum power from a solar panel, and the necessity to place a constraint on the output voltage, the cascaded combination of DC/DC converters 952 and 954 results in the respective efficiency losses of converters 952 and 954 being multiplied with each other. Attempting to harness maximum overall system power using cascaded converters may therefore ultimately lead to a net loss as a result of the significant losses experienced in converter modules 952 and 954.

Another embodiment for implementing control function 920 presented in FIG. 9 may include a single DC/DC converter, performing an optimization of input power collection while also satisfying output voltage constraints. An output constraint may be specified as a hard constraint or an elastic constraint. A hard constraint may refer to a constraint that the control system is instructed to meet under all circumstances. One example of a hard constraint may be implied in FIG. 9, which indicates that the output voltage of any individual panel's converter module $V_O$ is to be lower than a maximum value $V_{O-MAX}$. An elastic constraint, by contrast, may provide emphasis (represented by 902 and 906 in FIG. 9) to the control system by means of weighting the constraint as a part of a comprehensive overall control function. For example, a weight may be assigned to the control system's primary goal of optimizing input power, and a weight may also be assigned to the output constraint. While in a stable state the control system may not completely optimize the input power collection, and may not perfectly satisfy the elastic output constraint, as mentioned above, the overall system performance may still be optimized as desired.

Output voltage constraints are one of many constraints that may be applicable in a given system. In one sense, an output-current constraint, either hard or elastic, may resemble the properties of a voltage constraint as described herein. Application of a power constraint may be straightforward also. As previously mentioned, DC/DC converters may be considered to operate as constant power transfer devices, where output power is equal to input power, with any difference between the input power and output powers stemming from switching losses and other losses within the converter. However, a hard constraint or elastic maximum constraint may easily be applied to the output power such that the control system's primary goal of input power optimization is explicitly specified. In one set of embodiments, output constraints may be applied to converter modules in a series string configuration (e.g. as shown in FIG. 1 and FIG. 2a), or in a parallel configuration (e.g. as shown in FIG. 2b) according to at least two methods: static assignment and dynamic assignment.

Static assignment of output constraints may be specified (i.e. applied and/or performed) at system initialization, and the specified static constraint values may not change during normal system operation. FIG. 13 provides a pseudo-code implementation of one embodiment, in which static assignment of hard and elastic output voltage constraints are made. As seen in the example provided in FIG. 13 via the weighting of the input and output constraints that input regulation continually seeks to maximize input power collection. Three output constraints may be applied simultaneously. In the example code of FIG. 13, one hard maximum constraint on the output voltage is provided to limits the output voltage to a maximum value of 50V. In addition, two elastic constraints are provided to keep the output voltage above 20V and below 30V. As shown, there are four ranges of operation defined by four different sets of output constraints.

In a lowest range, $V_{OUT}$<20V, which violates one of the elastic constraints. Within this range, a weight is given to push $V_{OUT}$ above 20V, which is added when considering the optimization of input power. In a middle range, 20V<$V_{OUT}$<30V, and both elastic and hard output constraints are already satisfied. In this case input regulation may be performed by the controller as long as the maximum input power results in $V_{OUT}$ being within this range. In a third range of operation, $V_{OUT}$ is greater than the elastic maximum of 30V but below the hard maximum of 50V. Similar to operation in the lowest range, a weight is given to pull $V_{OUT}$ below 30V, which is added when considering the optimization of input power. A final, fourth range corresponds to a voltage output greater than 50V. In this range, a hard constraint is violated. When $V_{OUT}$ enters this range, the controller may enter an output-only regulation mode, neglecting its primary objective of input power optimization to simply ensure that the output voltage does not rise above this maximum value. To put it another way, in this range, the controller's only goal is to pull the output voltage $V_{OUT}$ under the specified hard maximum value of 50V. It should be noted that all numeric values are provided as examples, and the code and its obvious variants may include different values specified to meet the given requirements of any system. In one sense, the pseudo-code shown in FIG. 13 may be considered one implementation of the control function shown in FIG. 10. It should be noted that the particular voltage values presented above are exemplary, and the value(s) of the voltages may be set/specified/determined according to the previously described methods for managing the bus and protecting the inverter as well as the local DC/DC converter.

In the case of dynamically assigned constraints, the constraints may be automatically updated during the course of normal run-time operation based on or according to the given dynamics of the system. Dynamic constraints may be modified by the DC/DC control system itself, or they may be modified based on communication and information gathered about the larger system state. FIG. 14 provides a pseudo-code implementation of one embodiment, in which dynamic assignment of a single hard maximum output voltage constraint is made. This example may be taken in the context of FIG. 2a, in which multiple solar panels are connected in a series string, and the aggregate voltage output $V_{OUT\_MAX}$ of the string may be constrained to the NEC standard 600V, or set to 588V as shown in FIG. 9. Referring to the pseudo-code in FIG. 14, upon system initialization each panel's DC/DC converter may be allocated an initial value $C_p$, which represents the hard-constrained maximum output voltage it may generate. This initial value may be equally distributed among the panels in the series string in discrete units $V_{cred}$. Each panel may be allocated $C_p=C_{pINIT}=V_{sMAX}/(V_{cred}*N)$, where 'N' is the number of panels. A dynamically assigned hard constraint may be placed on the output voltage for each panel: $V_p<(C_p*V_{cred})$. The constraint is dynamic because $C_p$, which represents the initial value for the maximum allowed output voltage, may change during the system's run time. When the input-regulated DC/DC converter associated with the panel determines a maximum input power point which would cause the output voltage to be set to a value less than the currently allowed maximum output voltage, the converter may remains in pure input regulation mode. The converter may set its state to the maximum input power point. The difference in output voltage $V_{OUT}-(C_p*V_{cred})$ represents excess credit. This excess credit may be released in the form of discrete units of Vcred, and used by other modules within the same series-string upon request. In one sense, the pseudo-code shown in FIG. 14 may be considered one implementation of the gain function $F(V_O)$ shown in FIG. 10 as part of control function component 926.

When the panel module's input-regulated DC/DC converter determines a maximum input power point which would cause the output voltage to be set greater than the currently allowed maximum output voltage, the converter may enter pure output regulation mode. The converter may set its state as close as possible to the maximum input power point, while the output is limited by its hard constraint. Simultaneously, a communication mechanism may be used of broadcast a request for additional credit in discrete units of Vcred, which may be granted by one or more other panels in the same series-string. As previously mentioned, various embodiments of the control function disclosed herein may be implemented using digital hardware and firmware, utilizing any combination of microcontrollers and associated peripherals as shown for example in FIG. 5. That is, the control function shown in FIG. 10 may be implemented as part of control system 504, for example as part of MPPT control algorithm 512.

Figure 15:
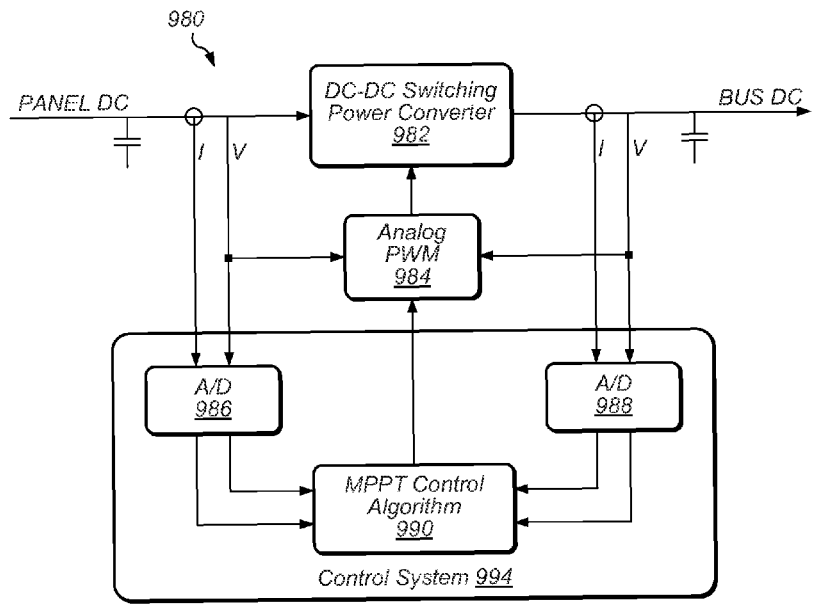
FIG. 15 shows one embodiment of a hybrid digital/analog converter architecture configurable to execute the control function shown in FIG. 10.

It should also be noted that control system 504 may be partitioned into a hybrid digital/analog system. For example, in one set of embodiments, the weighting functions for input and output regulation and the MPPT may be partitioned into different subsystems. FIG. 15 shows one possible embodiment 980 with a single power converter 982 associated with a corresponding panel. In embodiment 980, the output voltage regulation and management loop may be embedded into a microcontroller environment (including control system 994), utilizing an analog subsystem 984 for either Vin (input voltage) regulation, or a combination of weighted Vin and Vout regulation. That is, either Vin regulation, or a combination of weighted Vin and Vout regulation may be implemented as part of analog PWM control 984. Again, when MPPT control algorithm 990 within control system 994 is implemented digitally, A/D converters 986 and 988 may be used to obtain digitized values for the monitored current and voltage values. Note that, if the system is designed with a separate Vin regulation loop, the Vout regulation loop may be directly incorporated into the analog loop by incorporating a low-gain analog $V_{out}$ path into the analog PWM controller feedback (984). The system in FIG. 15 may also be designed to route the $V_{out}$ feedback through the reference control system normally associated with the MPPT control path (990), and have the $V_{out}$ regulation control implemented in microcode.

Another Perspective on DC-Bus Voltage Coercion

A previously mentioned, a typical photovoltaic (PV) array may consist of PV panels connected into strings, which may then be connected in parallel to a DC bus. This DC bus may be the input to an inverter, which converts the DC input to an AC source. The stacking of PV panels within a string increases the voltage of the DC bus without increasing the current. Placing multiple strings in parallel increases the current through the bus without increasing the voltage. Total DC power from an array is equivalent to the multiplicative product of the DC bus voltage and DC bus current.

As with any DC power supply, a PV panel has a characteristic voltage versus current curve, otherwise referred to as an I/V characteristic curve. As also previously mentioned, the I/V characteristic curve includes a point of maximum voltage, at which no current is taken from the panel and the output power is zero, known as the open-circuit voltage ($V_{oc}$) measured in volts. As further previously mentioned, the I/V characteristic curve also has a point of maximum current draw ($I_{sc}$), beyond which the panel's output voltage drops to zero, and no additional current can be supplied, with the output power also being zero. This point is known as the short-circuit current ($I_{sc}$) measured in amps.

The I/V characteristic curve for a PV panel indicates that there is a finite suitable range over which power may be harvested. At both extremes $V_{oc}$ and $I_{sc}$, no power may be taken from the output. For a given PV panel there exists a single optimum point at which the output voltage $V_p$ is less than $V_{oc}$, and the output current $I_p$ is less than $I_{sc}$, at which the output power is maximized. This point is commonly called the maximum power point (MPP). The MPP may be significantly different from panel to panel, and may also move around significantly during the course of a day for an individual panel. This is the reason that the MPP is actively tracked using one of several types of algorithms collectively referred to as Maximum Power Point Tracking (MPPT). Factors that influence the position of the MPP include, but are not limited to, manufacturing variations, temperature, and degree of insolation.

A generic MPPT algorithm involves moving a power source's output voltage up and down by a small amount relative to its present operating point. Power is measured at both the higher and lower voltage levels. A change to the operating point is made in the direction of higher power. Numerous variations on this basic scheme include different up/down probe waveforms, different methods for averaging voltage and current measurements before computing power, and constraints on the movement of the computed MPP.

Traditionally, the inverter performs MPPT on an entire array of PV panels at once, by measuring only the power on its DC bus input. Unfortunately, this method typically forces a compromise between the many MPPs of the panels within the array. As previously noted, each PV panel has its own MPP. Distributed MPPT solves this problem by placing an intelligent DC-DC converter (optimizer) behind each PV panel within an array. The input of the optimizer performs MPPT on the individual PV panel. The output of the optimizer becomes the traditional connectivity point for creating strings, and is ultimately connected to the DC bus. Adding such optimizers to PV panels, and distributing MPPT within the array, leads to a greater total energy harvest. Examples of such arrays are shown in FIGS. 2a and 2b.

However, an optimizer may have the side effect of changing the I/V characteristic curve for the panel to which it is connected. As previously mentioned, since the optimizer is typically a DC/DC converter at its core, the input is typically fixed at the local panel's MPP, but the output operates as a constant-power port. The I/V characteristic curve of the optimizer is a rectangular parabola of the form $I=P_{MPP}/V$, where $P_{MPP}$ is the power corresponding to the panel's MPP. This constant-power characteristic is what appears on the DC bus, which is quite different in comparison with the I/V characteristic curve of an unoptimized array.

As mentioned above, a power inverter (DC/AC) traditionally performs MPPT on the entire array based on a probe of the DC bus. A compatibility problem arises when an inverter attempts to perform MPPT on an optimized array, because its I/V characteristic curve is completely flat with regard to power. The inverter may not perceive any measurable differences in power between a higher or lower voltage level. As the inverter continues probing the DC bus, its MPPT algorithm may not perform optimally, based on measurements below the noise margin, and the bus voltage may vary wildly and arbitrarily.

Although the total power taken from the DC bus may be constant regardless of the DC bus voltage, there are important reasons why the bus voltage may need to be regulated. Both the optimizers (converter units, or DC/DC converters) and the inverter are inherently power conversion devices, and as such, they have operating points, which are more or less optimal and reduce internal losses. An optimizer is most efficient when its output voltage is the same as its PV panel input— which is also equivalent to the MPP of the panel during normal operation (and/or during normal operating conditions) of the optimizer. An inverter also has specific efficiency curve determined in large part by its design. A voltage that is too high or too low may cause the inverter's efficiency to drop dramatically, or cause the inverter to shut down. Because potential incompatibility between the optimizers and the inverter is introduced by adding optimizers behind each photovoltaic (PV) panel, it may be most effective to design the optimizers to also solve this problem. The optimizers may therefore be designed to regulate the DC bus voltage in a distributed manner, and do so in the presence of a potentially large amount of noise. It may not be necessary for the optimizers to communicate with each other to effectuate bus voltage regulation, but a means of communications between the optimizers may be beneficial.

In one set of embodiments, regulation of the DC bus voltage in a PV array may be performed by a large number of distributed solar power optimizers. The regulation may be achieved either with or without communication between the optimizers, and may operate reliably in the presence of mismatches and noise. The means by which the DC bus voltage is regulated may be indirect, utilizing the inverter's own MPPT controller on the DC bus.

The small-signal amplitude of the inverter's MPPT probe signal may be detected on the DC bus by keeping a history of the minimum and maximum absolute value over a period of time. Based on this history, an optimizer may determine when the probe signal is high or low. The optimizer may intentionally shed power when the probe signal moves in the direction opposite of the desired direction. If the optimizer attempts to effect a bus voltage drop, it may shed power when the inverter's MPPT probe signal is detected to be in a high state. Similarly, when the optimizer attempts to effect a bus voltage increase, it may shed power when the MPPT probe signal is detected to be in a low state. The means that the extent by which the optimizer may intentionally shed power may include adapting its input to move off of the local PV panel's MPP. The system may be designed to be robust in the presence of noise within strings of optimizers, noise on the DC bus, and mismatch (static error) in the measurements taken between optimizers.

Figure 16:
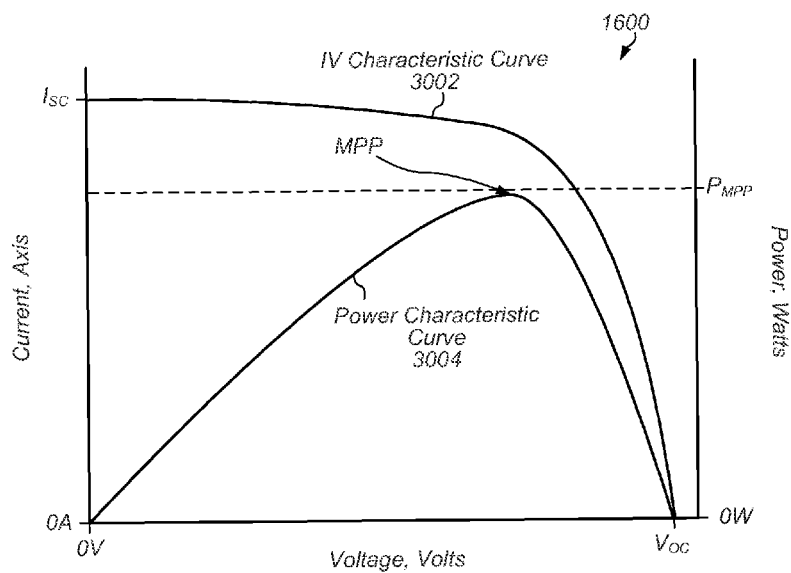
FIG. 16 shows a function diagram illustrating an IN characteristic curve overlaid with a power curve for a typical unoptimized PV panel.

FIG. 16 shows a function diagram 1600 illustrating an IN characteristic curve 3002 overlaid with a power curve 3004 for a typical unoptimized PV panel. As seen in FIG. 16, power is zero at the extremes of the power characteristic curve 3004 (at both $I_{sc}$ and $V_{oc}$), with the maximum power point (MPP) appearing at the highest point of curve 3004. As also seen in FIG. 16, curve 3004, which is representative of most PV panels, has a very sharp upper edge. It therefore becomes very easy to crash the input voltage by taking too much current from the panel on the LEFT side of the MPP. Thus, the RIGHT side of the MPP defined as a SAFE side and the LEFT side of the MPP may be defined as an UNSAFE side.

Figure 17:
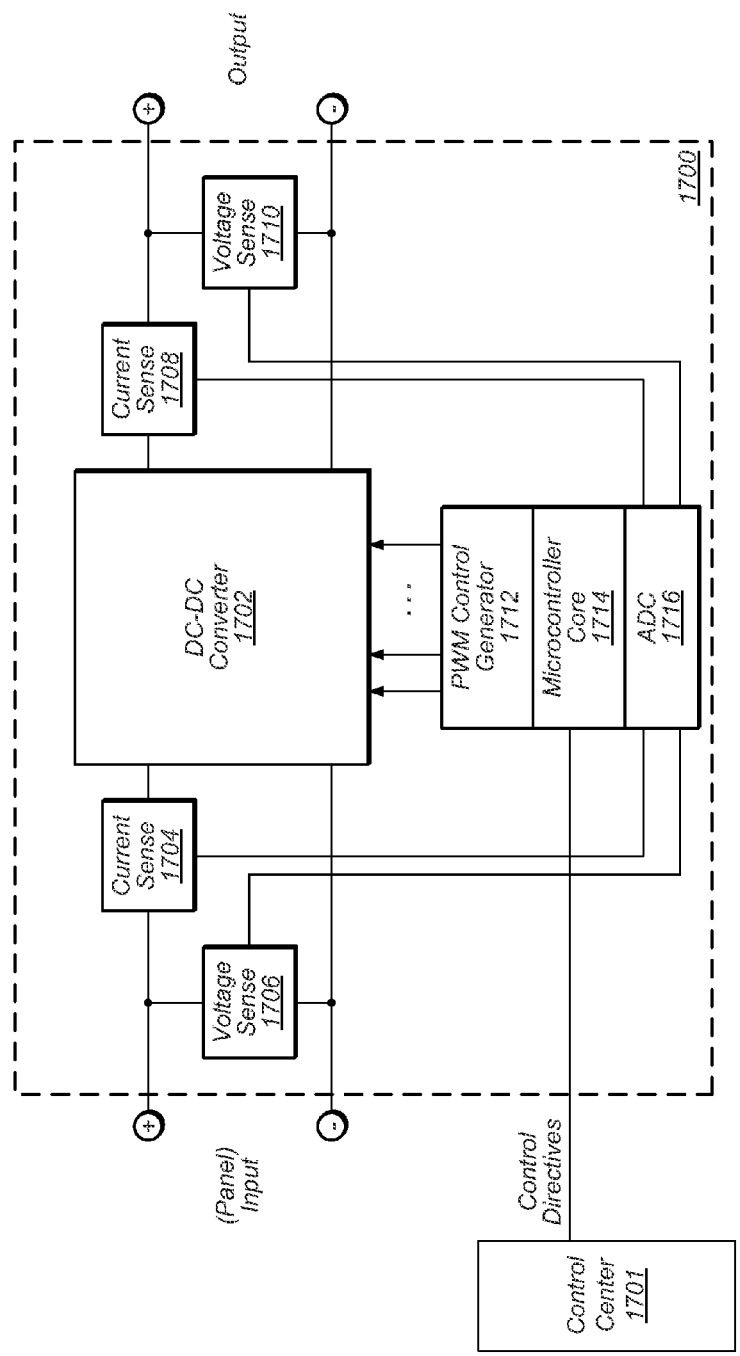
FIG. 17 shows a partial block diagram of one embodiment of a P/V panel optimizer.
Figure 18:
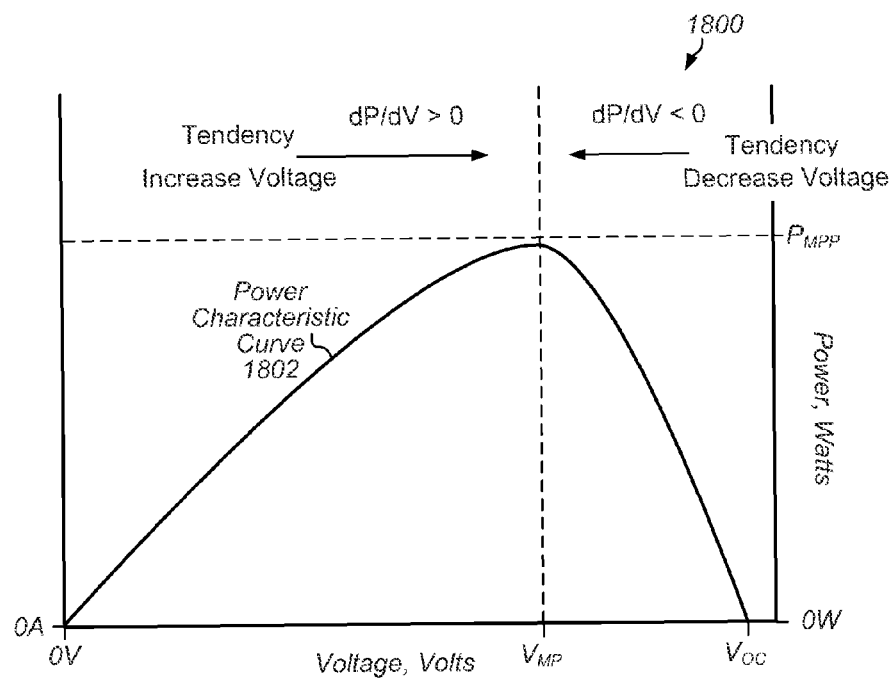
FIG. 18 shows a function diagram illustrating the operating principle of a generalized Maximum Power Point Tracking algorithm.

FIG. 17 shows a partial block diagram 1700 of one embodiment of a P/V panel optimizer 1700. Note that the core DC-DC converter 1702 may be an input-regulated type, rather than an output-regulated type. Accordingly, The input may be regulated to the panel's MPP and may perform MPPT. The output may be operated as a constant-power port, with voltage and current behaving freely as shown in FIG. 18. Current sense element 1704 and voltage sense element 1706 at the input of converter 1702 may provide sensed values of the input current and input voltage, respectively, to ADC 1716, which may provide corresponding numeric values of the input current and input voltage to microcontroller core 1714. Similarly, current sense element 1708 and voltage sense element 1710 at the output of converter 1702 may provide sensed values of the output current and output voltage, respectively, to ADC 1716, which may provide corresponding numeric values of the output current and output voltage to microcontroller core 1714. Microcontroller core (or any processing element and/or hardware/software combination) may be configured to execute/implement the appropriate MPPT and constant-power port algorithms, to determine the values of the control signals (in this case PWM signals provided by PWM control generator 1712) to regulate the input voltage/current of converter 1702, and the output voltage/current of converter 1702.

FIG. 18 shows a function diagram 1800 illustrating the operating principle of a generalized Maximum Power Point Tracking (MPPT) algorithm that may be executed/implemented by microcontroller core 1714. Note that while a considerable number of variations are possible for this generalized MPPT algorithm, all those variations may involve probing of the source. The probe is typically a voltage probe, but could also be a current probe. The many variations between different MPPT algorithms may also include differences in the way that the measurements are averaged for higher accuracy.

Figure 19:
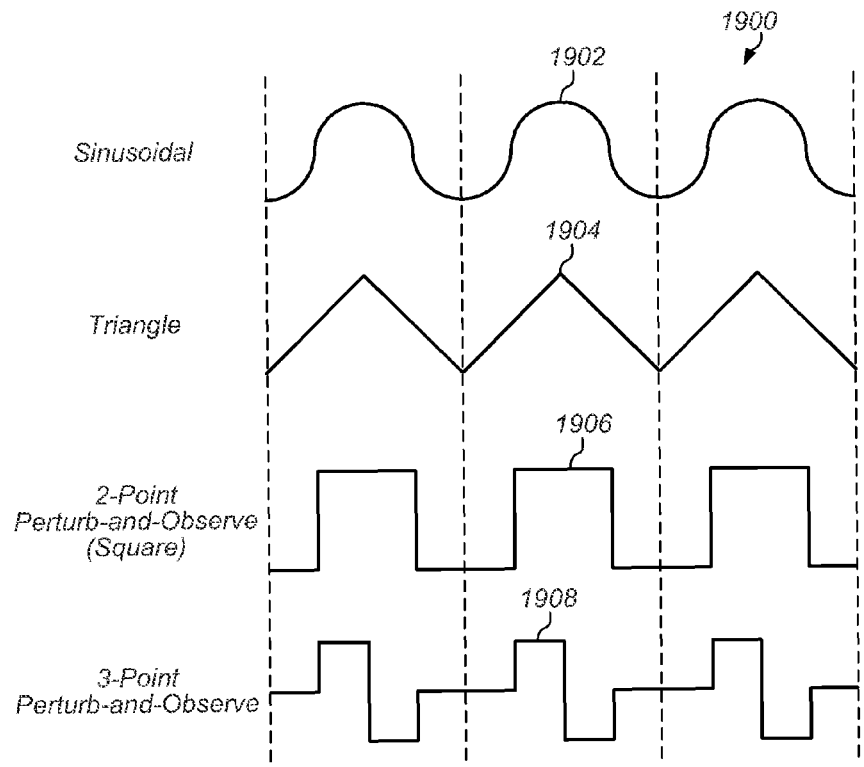
FIG. 19 shows waveform diagrams illustrating various common MPPT probe waveforms.

FIG. 19 shows waveform diagrams illustrating various common MPPT probe waveforms 1900 that may be used in various different embodiments executing an MPPT algorithm. The waveforms may be sinusoidal waveforms 1902, triangle waveforms 1904, 2-point perturb-and-observe square waveforms 1906, and/or 3-point perturb-and-observe waveforms 1908. The various embodiments of inverter input voltage regulation described herein may work equally well with any kind of probe waveform that an inverter may use.

Figure 20:
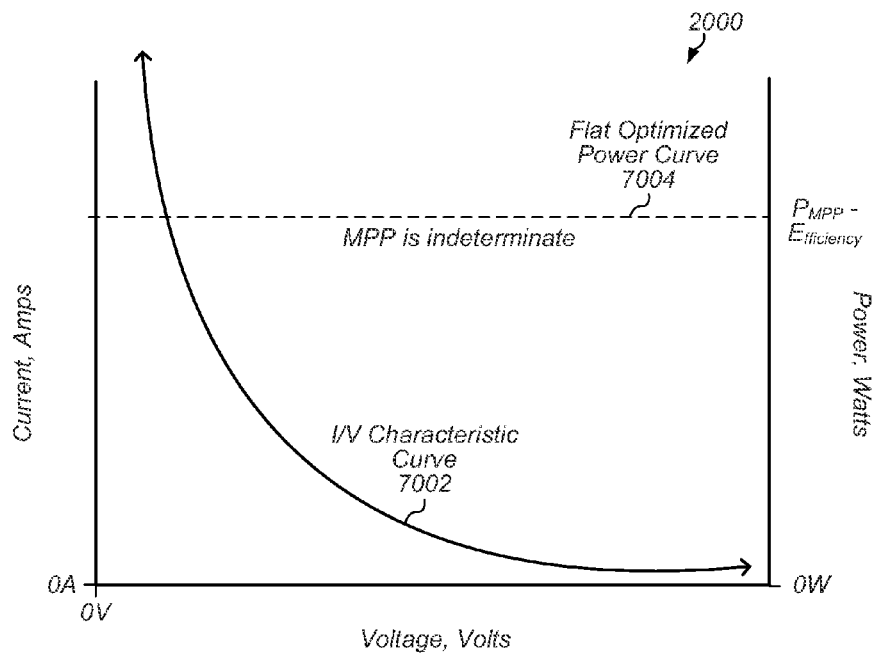
FIG. 20 shows a function diagram illustrating an IN characteristic curve overlaid with a power curve corresponding to the output of an array of optimized panels, as seen by an inverter on the DC bus.

FIG. 20 shows a function diagram 2000 illustrating an IN characteristic curve 7002 overlaid with a power curve 7004, where the power curve 7004 corresponds to the output of an array of optimized panels, as seen by an inverter on the DC bus (e.g. as shown in FIG. 1, and FIGS. 2a-b). Note that the optimizer output may be thought of as operating as a constant power port, resulting in the power curve for the entire array in aggregate remaining completely flat. Accordingly, the inverter's MPPT algorithm seeking to find a maximum may lead to an error and voltage fluctuations on the DC bus voltage. In other words, on a flat power curve (such as flat optimized power curve 7004), the MPP may be indeterminate.

Figure 21:
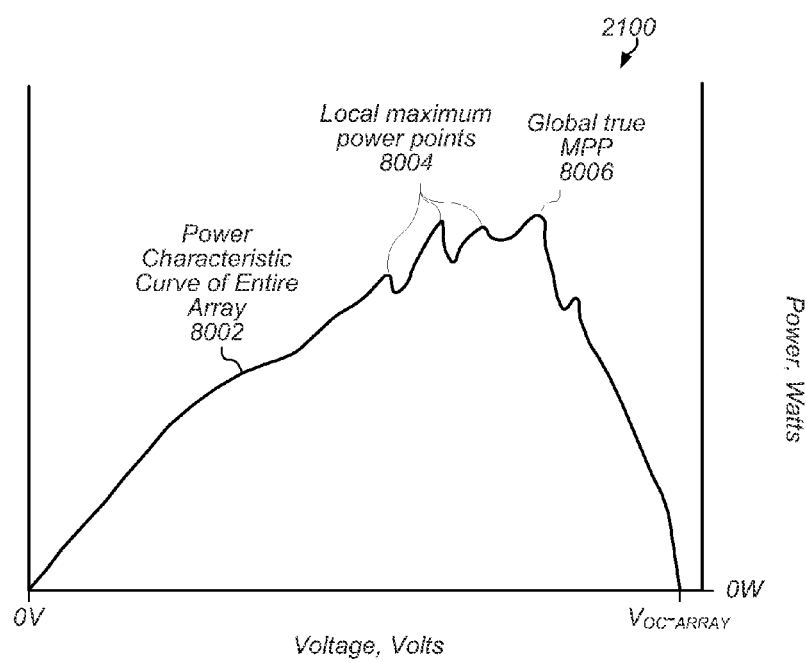
FIG. 21 shows a function diagram illustrating a current and voltage curve in addition to a power curve for an entire unoptimized array of aggregated panels, as seen by an inverter on the DC bus.

FIG. 21 shows a function diagram 2100 illustrating a current and voltage curve in addition to a power curve for an entire unoptimized array of aggregated panels, as seen by an inverter on the DC bus (e.g. as shown in FIG. 1, and FIGS. 2a-b). As seen in FIG. 21, the power curve 8002 for an entire unoptimized array, as seen on the DC bus, may be multimodal (may contain multiple local optima). Specifically, in this case, power characteristic curve 8002 may include local maximum power points (local MPPs) 8004 and 8006, of which local MPP 8006 represents a global, true MPP. In one set of embodiments, the inverter's MPPT algorithm may be directed to latch on to any one of these local optima. It is also worth noting that the MPP detected by the inverter may seldom be the proper MPP for an individual panel.

FIG. 22 shows one embodiment of a generic MPPT algorithm 2200, with an additional setpoint. Adding a setpoint is one important aspect in managing the input voltage of the inverter as described herein. Note that the parameter setpoint is a parameter of the system, and may therefore be tuned. In this context, the setpoint is the target slope on the power curve (such as power curve 8002 in FIG. 21, for example). At the MPP, the slope is zero, so in order for the control algorithm to move to the MPP, the setpoint may be set to zero. A positive setpoint causes the control algorithm to move to a lower operating voltage, and to operate at a lower power point. A negative setpoint causes the control algorithm to move to a higher operating voltage, and again, to a lower power point. With coercion, lower power may be presented to the inverter when the inverter is moving the bus voltage in the wrong direction. The setpoint therefore provides a controlled, robust means for reducing power. Nominally, to maximize power production the setpoint may be set to zero, and to reduce power production the setpoint may be changed as required.

The minimum and maximum of the optimizer's output range may be computed over a given time period by performing a slow averaging of the output voltage, using the inverter's voltage probe. This makes it possible to determine the centerline of the voltage probe for synchronizing the power shedding to the inverter's voltage probe. The inverter may thereby be coerced by shedding power within the appropriate time interval of the probe signal. Furthermore, this average output voltage value may be used for comparison to the preferred voltage range thresholds, to trigger the states that determine the direction in which to coerce the inverter and when to release coercion to minimize excess power loss during the coercion process. In addition, the extent of the high and low voltage probe may be determined over a given time interval, and upon expiration of the time interval, the working values may be replaced with the newly computed working values for the previous period, and the system may begin computing a new minimum and new maximum for the current period. The peak probe magnitudes of the inverter probe may thus be determined, and these magnitudes may be compared against an expected range, to determine the presence of the inverter probe for enabling the coercion control system. In one set of embodiments, a state machine may control when the setpoint is applied, to ensure that the setpoint influences the shift in the Vin voltage target in one direction, independent of the direction in which the coercion algorithm is attempting to move the output voltage. The coercion algorithm may use fixed thresholds, and various levels of hysteresis may also be implemented, as will be further described below. Many different approaches similar to the 'inverter probe presence' detection described above, and the use of hysteresis thresholds for triggering the setpoint engagement may be used to alleviate the problems of noise and unintentional module interaction.

Possible Design Objectives for DC-Bus Voltage Coercion

One key function of commercial optimizers is to provide maximum-power point tracking (MPPT). With matched panels, this process is straightforward, as the power curve (versus power or current) is unimodal and smooth. Simple algorithms, like 'Perturb & Observe' typically provide fast, accurate locating and tracking of the maximum-power point. However, as noted above, a disadvantage to DC optimizers is that they act to eliminate the voltage-dependent power gradient over the power curve; i.e., they make an array's power production largely independent of string voltage. As a result, with DC optimizers, an inverter does not have a power gradient to guide its choice of string voltage. Thus, the bus voltage is likely to drift in an uncontrolled and unpredictable fashion, which may be undesirable because the voltage can drift to the operating limits of the inverter. Also, the voltage may likely drift outside the target/desired operating voltage of the inverter.

To constrain the bus voltage to operate within a particular range, the inverter may be presented with a power gradient that compels the inverter to hold the bus voltage within a target operating range. Unfortunately, artificial power gradients may unavoidably result in efficiency losses. A flat power curve that operates exactly at the MPP may provide optimal power efficiency, but deviations from that curve may result in an efficiency drop. In addition, the inverter may ignore weak power gradients. The voltage and current measurements made by the inverter may have limited precision, and may also be impeded by measurement noise. However, if the gradient reaches and/or surpasses a certain preferred value, the inverter may see it over the noise and measurement resolution. It may also be advantageous to minimize the number of modules that may present a gradient. Ideally, a single module in an optimized string may alone present a power gradient that is sufficient to compel an inverter to move the bus voltage in response. Thus, key objectives of DC bus voltage regulation, and thus DC bus voltage coercion, include presenting a strong power gradient to the inverter, while minimizing the corresponding system efficiency loss.

Leveraging the Inverter's MPPT Algorithm

Figure 23:
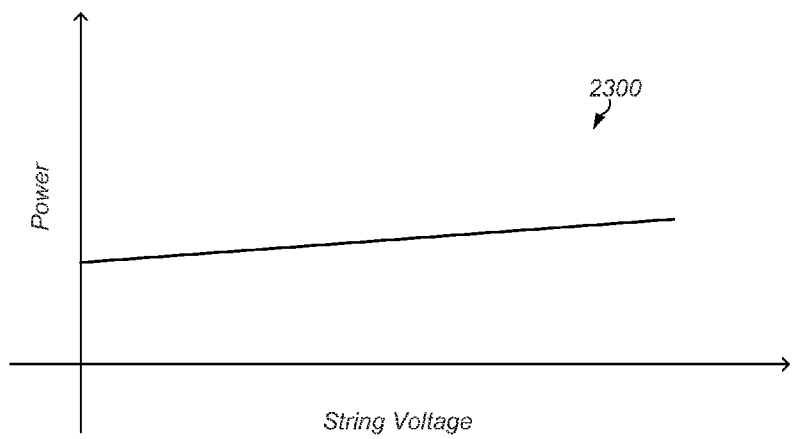
FIG. 23 shows a function diagram illustrating the power curve for a photovoltaic panel string.
Figure 24:
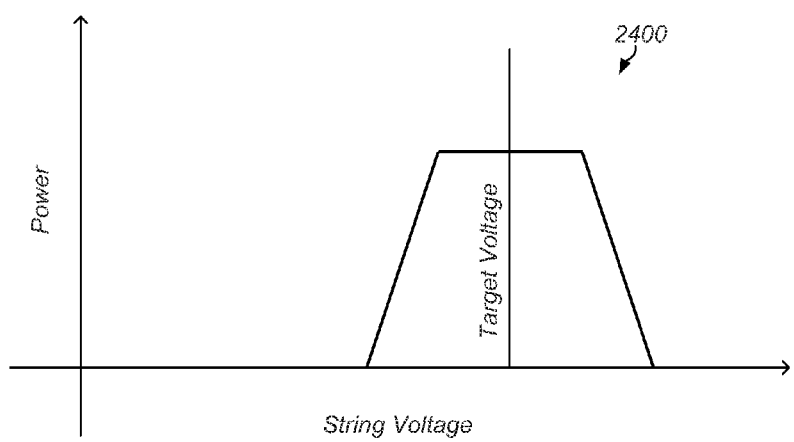
FIG. 24 shows a function diagram illustrating the power curve for a photovoltaic panel string, with an artificially created flat region around a target voltage range, with a panel-like gradient on each side of that flat region.

FIG. 23 shows a function diagram 2300 illustrating the power curve for a photovoltaic panel string. One way to use the inverter's MPPT algorithm to provide voltage regulation is to present artificially created power gradients that look like the gradient from a PV panel. In other words, the optimizers may be operated to create a flat region around the target voltage range, with a panel-like gradient on each side of that flat region, as shown in FIG. 24. As seen in FIG. 24, power curve 2400 presents a panel-like gradient—similar to that represented by power curve 2300—on each side of a flat region corresponding to a constant power port. In principle, the inverter's MPPT algorithm may detect the power gradients shown in FIG. 24, and may attempt to hold the string voltage within the upper flat region, as part of its normal power-optimization process.

One consideration when using this approach is the potentially small size of the flat gradient. Since the gradient provided by one module may be only as large as the gradient provided by a single panel, the gradient detected by the inverter may be much smaller than in the case of an unoptimized string if all modules are not providing the same gradient. Normally, with an unoptimized string, all panels may present the same gradient to the inverter. With an optimized string, only one of a specified number (N) of PV panels of a 1×N PV panel string may actually present a gradient at any particular time. Thus, the coercion algorithm may compensate for this by having each optimizer in a 1×N PV panel string present a gradient that is N-times larger than the gradient of a single panel. This approach does increase the per-panel losses due to the generation of the gradient, but ultimately the total power losses are limited to the power required to coerce the inverter to move to within the preferred range.

One Proposed Improvement: Mobile Gradient

Figure 25:
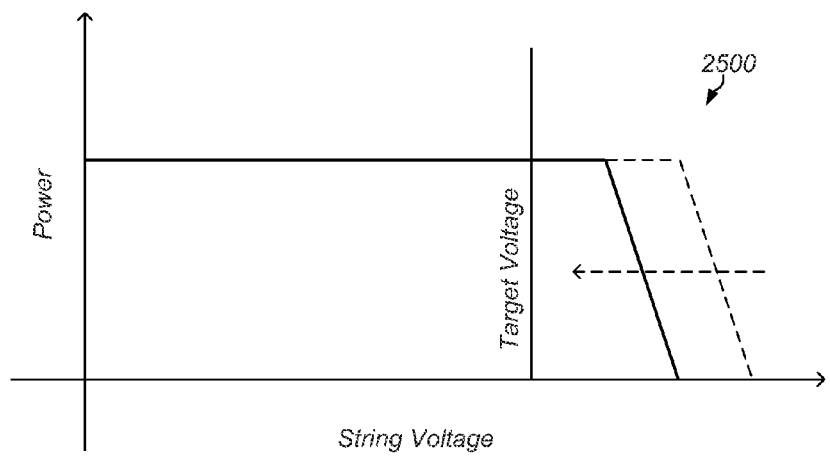
FIG. 25 shows a function diagram illustrating the power curve for a photovoltaic panel string, with a negative gradient shifted down in voltage (or current) as the bus voltage is moved down.

One possible improvement is to have a mobile gradient. In other words, the gradient may be centered on the current voltage, but the sign of the slope may determine the desired direction of bus-voltage movement. In this case, the gradient may shift up or down in voltage to stay aligned with the current (present) voltage. The slope of the gradient may be chosen to push the bus voltage in the direction of the target bus voltage. Once the voltage is within the target range, the gradient may be removed, and the flat power curve may be restored. For example, to push the bus voltage down, a negative gradient may be synthesized by the power converter module, and that gradient may be shifted down in voltage (or current) as the bus voltage is moved down, as shown in diagram 2500 in FIG. 25. It should be noted that in a control system using this approach, a panel's MPP voltage may change with respect to time, due to changes in cell temperature, for example. To minimize the power loss resulting from operating based on the MPP, the bus voltage may be kept as close to the MPP as possible while the inverter's MPPT algorithm probe sweeps the presented power gradient.

Creating Artificial Power Gradients

In general, power gradients (versus bus voltage) may be created by varying the module input voltage (i.e., the panel voltage) with the measured module output voltage (which reflects one module's contribution to the bus voltage). Normally, the module may work continuously to move its input voltage to the panel's MPP. To create a gradient, the module may deliberately allow changes in a module's output voltage to move the input voltage away from its panel's MPP.

Figure 26:
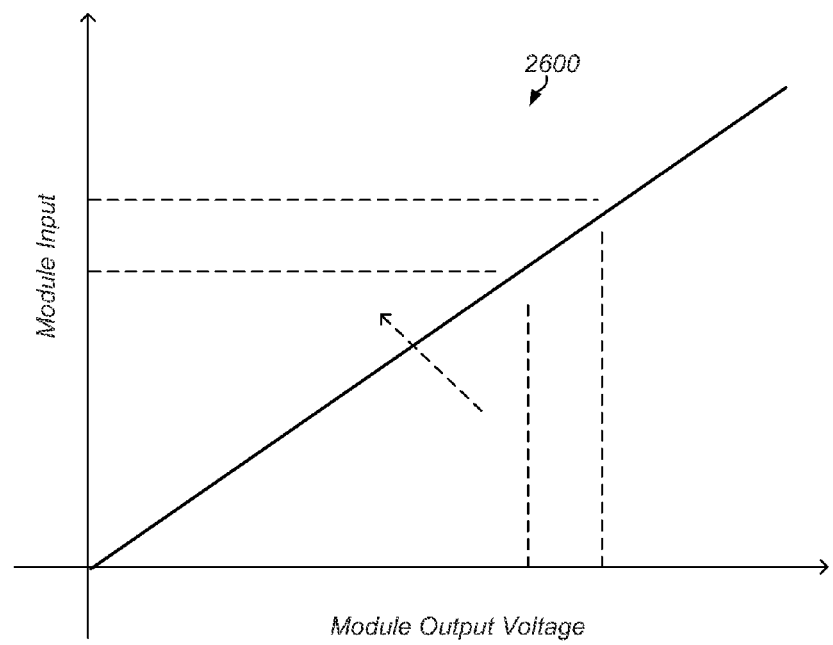
FIG. 26 shows a diagram illustrating the converter input voltage and converter output voltage linearly mapped with respect to each other.

One possible mapping between module output voltage and input voltage is a linear mapping. When the module input voltage and output voltage are linearly mapped with respect to each other, the input voltage may vary directly proportionately to the module output voltage. In this case, the probe waveform that is impressed on the bus voltage may appear at the inputs to the modules in the array, as illustrated in diagram 2600 in FIG. 26. In this case, a triangular probe waveform that is impressed at the output is reflected back to the input by the module's power controller.

Figure 27:
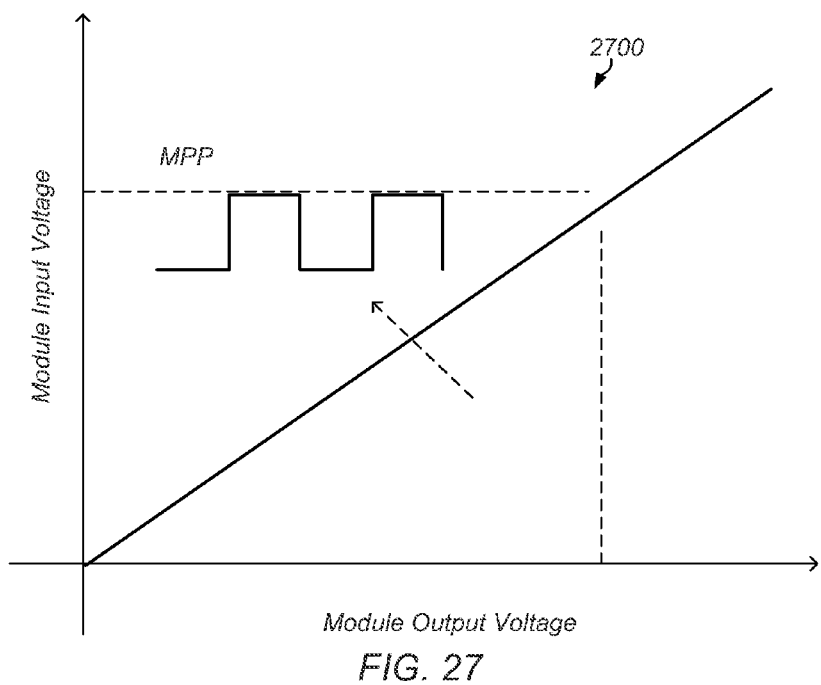
FIG. 27 shows a diagram illustrating the converter input voltage and converter output voltage mapped with respect to each other according to an alternative mapping formula.

One disadvantage to this approach is that it does not take into account the maximum power point at the module input. When the module is in this mode, its power controller may not know at what input voltage the MPP is located. The MPP may have been previously identified by the inverter's MPPT algorithm, but it is possible that the MPP may have moved since the time when it was identified. An alternate mapping between the module output voltage and input voltage is shown in FIG. 27. As shown in diagram 2700 of FIG. 27, the triangular probe waveform seen at the module output is mapped onto a square wave at the module input. The top of the square wave may be referenced to MPP, to enable the module to not lose track of the MPP. In addition, the apparent power gradient may be maximized for a given input-voltage step, since the input voltage may vary directly between the MPP and the maximum allowed input-voltage step.

Defining Coercion Targets

Figure 28:
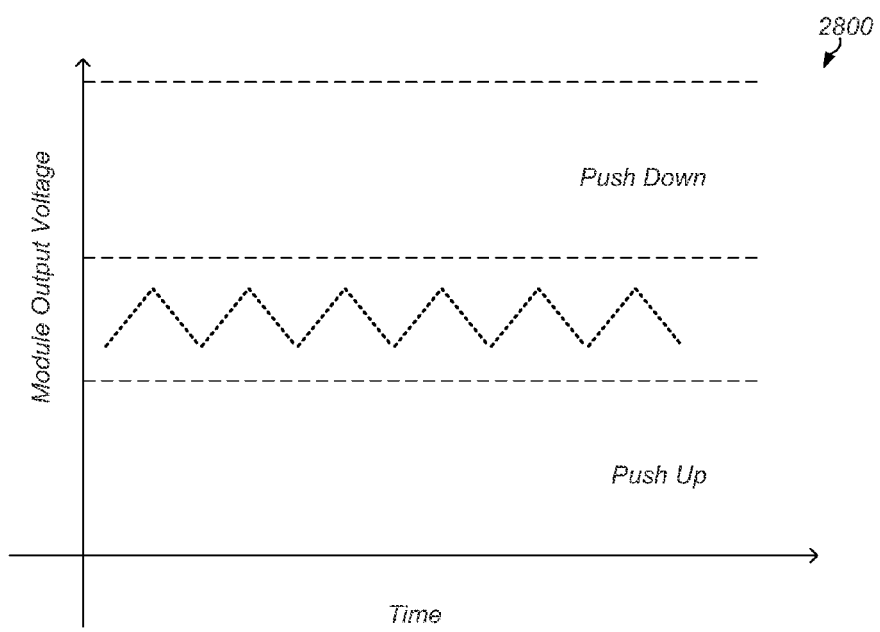
FIG. 28 shows a diagram illustrating thresholds being set for pushing up and pushing down the converter output voltage.

Once the voltage mapping has been defined, the time at which to enable the power gradient may be determined, with the objective of regulating the output voltage to a particular voltage range. One simple way of providing that control may be to set two thresholds—one for 'push up', and one for 'push down', as illustrated in diagram 2800 of FIG. 28. In this case, there are three regions. At low module-output voltages, the module's power controller may provide a power gradient that 'pushes' the output voltage up, toward the target voltage region. In the middle region, which is the target voltage region for bus voltage regulation, the module power controller may not push, but rather remain at the panel's MPP. In the top region, the module output-voltage may be too high, so the module's power control may present a power gradient that pushes the bus voltage down toward the target voltage region.

Figure 29:
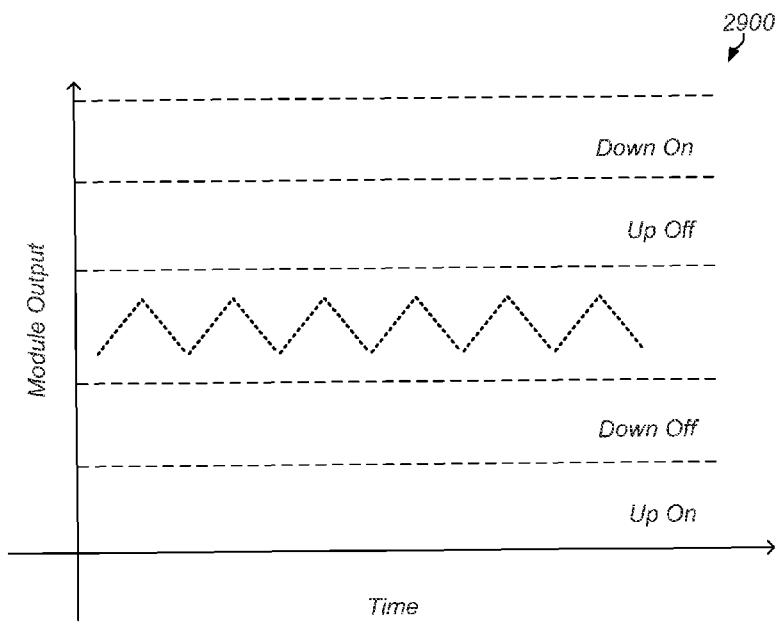
FIG. 29 shows a diagram illustrating thresholds being set for pushing up and pushing down the converter output voltage, with two additional thresholds added to reduce power loss.
Figure 30:
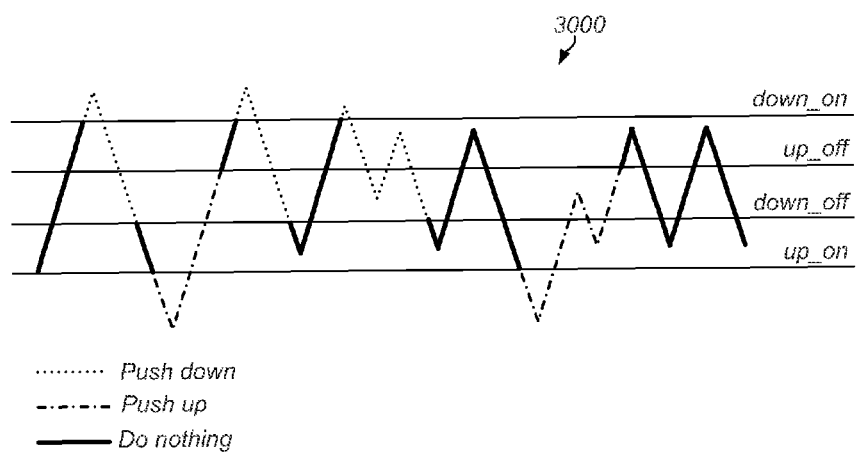
FIG. 30 shows a diagram illustrating bus voltage regulation hysteresis according to the thresholds illustrated in FIG. 29.

One disadvantage of the above configuration is that the inverter's bus voltage may have a bias toward moving in one direction, resulting in some of the modules in a string having to continuously push back to counteract that bias to maintain the bus voltage within the target region. The continuous application of a power gradient may cause more power loss than necessary. That power loss may be reduced, however, by adding two more thresholds to obtain four thresholds in all: 'up on', 'down off', 'up off', and 'down on', as illustrated in diagram 2900 of FIG. 29. These thresholds may effectively create a five-region hysteresis, as illustrated in diagram 3000 of FIG. 30. As the module output voltage moves up across the 'down on' threshold, the push down may be activated. The push down may be held on until the 'down off' threshold is reached. The 'up' thresholds work similarly. This arrangement allows the bus voltage to 'float' after it crosses an "off" threshold. This arrangement provides the benefit of allowing the modules to remain floating most of the time, i.e., at MPP, and thus, at maximum efficiency. The modules may need to invoke pushing only when an "on" threshold is reached.

In one embodiment, a control algorithm (designed according to the principles of threshold based coercive power gradient control described herein) may utilize information contained within the detected inverter probe voltage waveform to synchronize the power gradient application to the inverter probe. This maximizes the inverter's detection of the gradients, and therefore minimizes the excess power required to coerce the inverter to the desired voltage range. One method may include performing a very slow averaging of the detected inverter probe voltage waveform to find the centerline average of the signal. The centerline may then be used as a threshold for triggering the power gradient application, which may include shifting the input voltage setpoint to a preferred direction. Once this slow average centerline has been determined, it may be compared against the hysteresis thresholds to enter certain states as defined by the thresholds as follows: "down on" may cause the power gradient to be negative when the probe is above the centerline; "down off" may disengage the "down on" state, and remove all power gradient application; "up on" may cause the power gradient to be positive when the probe is below the centerline; and "up off" may disengage the "up on" state, and remove all power gradient application. This method optimizes the application of the power gradient to only the time intervals where it is useful for detection by the inverter, and may allow for an overall improved performance.

Furthermore, since the output voltage coercion detection and power gradient application control algorithm (also referred to as output power control algorithm) is decoupled from the input voltage regulation and MPPT algorithms, the power gradient may be mapped to the target input voltage in a straightforward and optimal manner. In one set of preferred embodiments, the input voltage may be preferably shifted to a higher voltage value as opposed to a lower voltage value, to the SAFE side of the V/I curve of the photovoltaic (solar) panel, according to an algorithmically determined setpoint, to generate a power gradient. Generating a slight power drop in this manner to create the power gradient may be preferred because, as previously described, it is far safer to shift the input voltage slightly higher than to shift it to a lower value, due to the sharp change in the input current versus input voltage of the solar panel V/I curve.

DC-Bus Voltage Coercion Through External Control

As an optional extension to DC bus voltage coercion, it may be helpful to have control directives transmitted to the power converter module. These commands may be sent wirelessly (e.g., via Zigbee) or via a wired connection (e.g., via a power-line modem). For example, for P/V panel optimizer (or power converter module) 1700 (in FIG. 17), control directives may be sent to module 1700 wirelessly, or via wired connection(s). In the embodiment shown in FIG. 17, the control directives are routed to and handled by microcontroller core 1714, which may then take appropriate action(s) according to various other settings and the input(s) from ADC 1716. While FIG. 17 shows a microcontroller core 1714 as the processing element, in other embodiments the processing element may be implemented differently depending on what the preferred implementation is for the various algorithms described above (e.g. the MPPT algorithm, power gradient creation, etc.). For example, the processing element(s) may include application specific hardware, microprocessor executing software, a combination of both, etc. Overall, the control directives may be processed by the processing element(s) regardless of the specific implementation of those processing elements within module 1700, to provide the necessary control signals to DC/DC converter 1702.

External control directives are useful because a module may not necessarily have the data it requires to make the best bus-voltage regulation decisions. In the absence of external control, a module may be limited to making measurements on its input and output. In the presence of panel impairments, the voltages and currents at those ports may have no necessary bearing on whether the bus voltage is too low or too high. Panel impairments in a string may cause a change in the respective output voltages of any number of modules in that string, which may disguise the apparent bus voltage from the modules' perspective. Normally, in the absence of impairments, the bus voltage may be distributed evenly between the outputs of modules in a string. For example, in a series string of 8 modules, for a bus voltage of 320 VDC the output voltage of each module in that string may be 320/8=40 VDC. However, if a panel in the string is weaker or stronger than the other modules in the string, its output voltage may be lower or higher than the output voltages of the other modules in the string. For example, if the output voltage of one module is lowered to 26 VDC, to maintain a bus voltage of 320 VDC, the other modules may need to raise their output voltages to 42 VDC to compensate; i.e., 42*7+26=320 VDC.

It may also be possible that with a specific target voltage, none of the modules may be satisfied with the observed output voltage. For example, none of the modules may be satisfied with the observed output voltage with a target voltage of 320VDC. The modules with an output voltage of 42 VDC may consider the bus voltage too high, and may attempt to push the bus voltage down, while modules having their output set at 26 VDC may consider their output voltage too low, and may attempt to push the bus voltage up. The modules may therefore conflict with each other, even with the bus voltage residing at the target voltage.

One possible solution to this problem is to loosen the target-voltage tolerance. In the above example, allowing for a 2V of variance from the target voltage may allow all of the modules to be satisfied with their output voltage, even though some module output voltages may be 2V too high, and some module output voltages may be 2V too low. However, output voltages can potentially vary by much more than 2V in practical settings, likely allowing the net bus voltage to vary too widely to be acceptable.

Another possible solution is to prevent individual modules from independently making decisions regarding the push direction. That is, the push direction may be determined by an external monitoring system that observes the bus voltage and the module output voltages. That way, conflicts between module push decisions may be avoided. For example, in the above example, with a string of eight modules, with seven modules each having an output voltage of 42 VDC, and one module having an output voltage of 26 VDC, no push command may be sent, since the net bus voltage may be exactly at the target voltage of 320V. Broadly speaking, the output voltages of individual modules may vary widely, even though the net bus voltage may remain at the target voltage.

It is worth noting that DC optimizers in a string may naturally compensate for impairments in their own string, without affecting the net bus voltage. A module that presents a low output voltage may be typically compensated for by the other modules in the string, with the other modules raising their respective output voltages in response, without changing the net bus voltage. Even dramatic, dynamic output-voltage disparities between modules may be tracked by string modules, transparently to the bus voltage, and thus, transparently to the inverter.

External Control Implementations

Thus, it may be desirable to have external control of the bus-voltage push decisions for individual modules. The external control may be designed with the capacity of dynamically changing the push status of individual modules to hold the bus voltage to within a particular range. Some possible control mechanisms may include wireless (e.g., Zigbee) or wired (e.g., power-line modem) control. The time resolution of the control commands may likely be very coarse, since the inverter is likely to allow the bus voltage to drift slowly with a flat power curve. The external commands may be sourced by a command center, which may have access at least to the bus voltage. If the bus voltage is too low, the command center may issue commands to the modules to push the bus voltage up. If the bus voltage is too low, the command center may issue commands to the modules to push the bus voltage down.

It may also be desirable to have the command center have access to the respective output voltages of the modules. If there are modules whose output voltages are near their maximum allowed output voltage, the command center (e.g. control center 1701 shown in FIG. 17) may choose not to move the bus voltage up, even though the bus voltage may be below the target voltage. The bus-voltage regulation commands to individual modules may have at least three attributes: push direction, desired output voltage change, and timeout period. A module may be programmed to push the voltage up toward the requested change until either the voltage change is effected, or until the timeout expires.

Fallback Operation

Even though it is beneficial to implement external control of the modules, there may be fault conditions in which external control may not be available. For example, in case of a wireless link failure. In these cases, a fallback to autonomous operation may be implemented. One possible fallback may be to have the modules timeout if a control command is not received within a specified period of time. After a module times out, it may stop attempting to push the bus voltage regardless of its observed output voltage. However, once all modules in an array have timed out, the bus voltage may drift without control. Since DC optimizers (modules) naturally present a 'flat' power curve to the inverter, the inverter may not see a power gradient. Since this is not a condition that inverters are typically designed to work with, an inverter may respond to a flat power curve in an indeterminate manner. For example, numerical errors in the inverter's MPPT may cause the bus voltage to drift in a particular direction. If the bus voltage drifts low, the bus current will rise. If the bus voltage drifts up, the bus voltage may exceed the maximum allowed value.

Therefore, the bus voltage may be allowed to at least drift low unconstrained, with the assumption that the system has been designed to accommodate the worst-case bus current, and that the inverter's MPPT does not allow the bus voltage to drift low enough to trip a low-voltage alarm shutdown.

At the high side, the bus voltage may need to be bounded to prevent violating NEC (National Electrical Code) guidelines, and to protect the inverter. A hard upper bound requirement may be placed on the output voltages of the modules, to prevent the sum of the module voltages in a string from exceeding the maximum allowed bus voltage. This limit may be invoked under abnormal, adverse conditions in the absence of external control, so system efficiency may not be a key concern in this case. However, if modules in a string move their respective output voltages up to the upper limit during normal operation—for example due to severe impairments on neighboring modules—the sharp gradient presented to the inverter may cause the inverter's MPPT to move the bus voltage down in response.

Externally-Controlled Module Voltage Bounds

The module output voltage may be bounded by the module, at least because the sum of the respective module output voltages may need to be constrained to not exceed the maximum allowed bus voltage. However, a fixed bound may unnecessarily limit the fault tolerance of an array of modules. Modules may compensate for low output voltage on other modules in the string by raising their respective output voltages. In other words, higher output voltage capability for a module enables that module to compensate for lower voltages on other modules in its string.

If a module is impaired, and presents a lower output voltage than the other modules in its string as a result, its maximum allowed output voltage may be decreased without affecting its operation. The output-voltage limits on other modules may then be raised without risking exceeding the maximum allowed bus voltage. Individual modules may therefore have the capacity to better compensate for reduced voltages at the respective outputs of other modules in the string, than if all modules had the same maximum allowed output voltage.

Having external control over the maximum allowed output voltage of all modules may be desirable. For example, the maximum allowed output voltage of modules that are known to have reduced output voltages due to panel impairments may be lowered. Reducing the maximum allowed output voltage on some modules may allow the maximum allowed voltage to be increased on other modules, thus improving the array's tolerance to panel impairments. A key objective with the operation of an array is to avoid having modules reach their maximum allowed output voltage, since the power output of the array may be dramatically reduced if the inverter attempted to move the bus voltage above that voltage.

Inverter Protection

With external control, the bus voltage may be constrained to operate in a narrow range, thus protecting the inverter from moving its voltage to extreme values. However, if external control is unavailable, individual modules may not be able to recognize whether their output voltage is too high or too low, and thus, may allow the bus voltage to drift to extreme values. If the bus voltage drifts to a value that is too low, the bus current may increase, perhaps to unacceptably high levels under high irradiance conditions. In addition, the inverter may allow the voltage to drop until a low-voltage alarm is triggered, causing the inverter to restart. If the bus voltage drifts to a value that is too high, voltage safety limits may be exceeded. The inverter may also trip a high-voltage alarm, triggering a restart. External control provides a mechanism to avoid these abnormal events.

To protect the inverter from moving the bus voltage to voltages that are too high, the power converter module may include a voltage-regulation mode that is enabled when the output voltage exceeds a specified threshold. The target voltages of the individual modules may be defined such that the sum of the target voltages of all of the modules in a string does not exceed the maximum allowed bus voltage. Regulating the bus voltage in this way may effectively create a hard upper bound on the bus voltage. While overall not as effective as the use of external control, such a voltage-regulation mode provides a reasonable fallback mode.

At low bus voltages, a similar technique may be used, but using current regulation. To prevent the current from exceeding a specified limit, individual modules may enable a current-regulation mode when the string current exceeds that limit. Current regulation in a module may result in an increase of its output voltage as the current attempts to exceed the limit, thus helping move the bus voltage up and away from the lower limit. However, current regulation may not be sufficient to prevent an inverter from restarting from a low-voltage alarm. Low voltage does not necessarily mean that the string current exceeds the current-limit threshold. Due to panel impairments, modules may coerce the inverter to move the bus voltage down to the minimum. Then, relatively small changes to shading conditions may result in a low-voltage alarm, which may in turn cause an inverter restart.

One way of preventing abnormal low-voltage alarms may be to again implement bus-voltage regulation, but limiting the minimum bus voltage instead of limiting the maximum bus voltage. In this case, a module may enter voltage regulation if its output voltage dropped below a specified threshold value. Attempts to lower the module output voltage below this threshold may cause the module to shift the operating point at its input to increase the output voltage, thus decreasing the string current. However, this may not guarantee the bus voltage dropping below the low-voltage alarm threshold, as some panels may be so severely impaired that their output voltage reaches zero. Even if the sum of the minimum voltages in a string is above the bus-voltage low-voltage alarm threshold, the bus voltage may still drop below the minimum if some panels in the string are severely impaired.

Numerous variations and modifications will become apparent to those skilled in the art once the above disclosure is fully appreciated. Note the section headings used herein are for organizational purposes only, and are not meant to limit the descriptions provided herein. Numerical values throughout have been provided as examples, and are not meant to limit the descriptions provided herein.

We claim:

1. A control module for controlling a power converter configured to couple to a solar panel to provide an output voltage and an output current to a bus, the control module comprising:
 a plurality of input ports, each given input port of the plurality of input ports configured to receive a different one of a plurality of parameters comprising:
  a first parameter indicative of an input current of the power converter provided by the solar panel;
  a second parameter indicative of an input voltage of the power converter provided by the solar panel;
  a third parameter indicative of an output voltage of the power converter; and
  a fourth parameter indicative of an output current of the power converter; and
 a controller configured to regulate the input voltage, input current, output voltage, and output current of the power converter according to a maximum power point tracking (MPPT) algorithm and an output power control algorithm, using the first, second, third, and fourth parameters as input values;
 wherein according to the output power control algorithm, the controller is configured to:
  allow changes in the output voltage of the power converter to move the input voltage of the power converter away from a maximum power point (MPP) voltage value corresponding to an MPP of the solar panel, and create localized power gradients of a characteristic of output power of the power converter versus an overall voltage on the bus;
  track, over a time period of specific duration, minimum voltage output values and maximum voltage output values for the output voltage of the power converter; and
  upon expiration of the time period:
   identify a peak minimum voltage output value of the tracked minimum voltage output values and a peak maximum voltage output value of the tracked maximum voltage output values; and
   control a timing and slope of the localized power gradients according to the peak minimum voltage output value and the peak maximum voltage output value.

2. The control module of claim 1, wherein to regulate the input voltage, input current, output voltage, and output current of the power converter, the controller is configured to provide one or more control signals to the power converter, wherein the controller is configured to determine respective values of the one or more control signals according to the MPPT algorithm, the output power control algorithm and the input values used by the MPPT algorithm and the output power control algorithm.

3. The control module of claim 1, wherein each of the localized power gradients compels an inverter coupled to the bus and performing MPPT to hold the overall voltage of the bus within a target operating range defined at least by the localized power gradient, while minimizing a corresponding system efficiency loss.

4. The control module of claim 3, wherein the controller is configured to center each of the local power gradients on a present value of the overall voltage of the bus, wherein a sign of a slope of the localized power gradient determines a desired direction of a movement of the overall voltage of the bus.

5. The control module of claim 3, wherein the controller is configured to choose a slope of the localized power gradient that results in the overall voltage of the bus moving towards a specified target voltage.

6. The control module of claim 3, wherein the controller is configured to no longer create the localized power gradient once the overall voltage of the bus is within the target operating range.

7. The control module of claim 3, wherein the control module is configured to receive external control directives comprising values for the target operating range for the overall voltage of the bus.

8. A control system for controlling a power converter configured to couple to a solar panel to provide an output voltage and output current to a voltage bus residing at an overall bus voltage, the control system comprising:
a sensing circuit configured to sense input current and input voltage of the power converter derived from the solar panel, and further configured to sense the output voltage and the output current of the power converter;
a controller configured to:
regulate the input voltage of the power converter according to the sensed input current and sensed input voltage of the power converter and according to the sensed output voltage and sensed output current of the power converter, to optimize power derived from the solar panel according to a maximum power point (MPP) of the solar panel;
allow changes in the output voltage of the power converter to move the input voltage of the power converter away from an MPP voltage value corresponding to the MPP of the solar panel, and create localized power gradients of a characteristic of output power of the power converter versus the overall bus voltage, wherein each of the localized power gradients compels an inverter coupled to the voltage bus and performing maximum power point tracking (MPPT) to track the overall bus voltage and maintain the overall bus voltage within an overall bus voltage range that ensures that the overall bus voltage is at a specified preferred value; and
track, over a time period of specific duration, minimum voltage output values and maximum voltage output values for the output voltage of the power converter; and
upon expiration of the time period:
identify a peak minimum voltage output value of the tracked minimum voltage output values and a peak maximum voltage output value of the tracked maximum voltage output values; and
control a timing and slope of the localized power gradients according to the peak minimum voltage output value and the peak maximum voltage output value.

9. The control system of claim 8, wherein the controller is further configured to apply the localized power gradients transiently, and synchronize the localized power gradients to an MPPT probe signal applied to the voltage bus by the inverter.

10. The control system of claim 8, wherein the controller is further configured to compute output voltage threshold values based on the peak minimum voltage output value and the peak maximum voltage output value, and control the timing and the slope of the localized power gradients according to the computed output voltage threshold values.

11. The control system of claim 10, wherein the controller is further configured to determine an average value of the output voltage of the power converter, and compare the average value of the output voltage against the computed output voltage threshold values in controlling the timing and the slope of the localized power gradients, to provide hysteretic control of the localized power gradients.

12. The control system of claim 11, wherein the controller is further configured to:
activate a first state upon the average value of the output voltage rising above a highest threshold of the computed output voltage threshold values, and maintain the first state until the first state is released;
release the first state upon the average value of the output voltage falling below a middle lower threshold of the computed output voltage threshold values;
activate a second state upon the average value of the output voltage falling below a lowest threshold of the computed output voltage threshold values, and maintain the second state until the second state is released; and
release the second state upon the average value of the output voltage rising above a middle upper threshold of the computed output voltage threshold values.

13. The control system of claim 12, wherein the controller is further configured to:
present a negative power versus output voltage gradient to the voltage bus when the first state is active and the output voltage becomes greater than the average value of the output voltage; and
present a positive power versus output voltage gradient to the voltage bus when the second state is active and the output voltage becomes lower than the average value of the output voltage.

14. The control system of claim 8, wherein to regulate the input voltage of the power converter, the controller is configured to execute a Maximum Power Point Tracking (MPPT) algorithm to:
measure first output power of the power converter at a first value of the input voltage representative of a target input voltage value;
measure second output power of the power converter at a second value of the input voltage representative of a present input voltage value;
if the measured second output power is greater than the measured first output power:
increase the target input voltage value by a first amount if the second value is greater than the first value; and decrease the target input voltage value by a second amount if the second value is less than the first value;

if the measured second output power is less than the measured first output power:

decrease the target input voltage value by a third amount if the second value is greater than the first value; and increase the target input voltage value by a fourth amount if the second value is less than the first value.

15. The control system of claim 14, wherein the controller is further configured to execute the MPPT algorithm to:

generate a new first value of the input voltage and a new second value of the input voltage.

16. The control system of claim 14, wherein the controller is further configured to algorithmically determine the first amount, second amount, third amount, and fourth amount.

17. A method for controlling a power converter coupled to a solar panel to provide an output voltage and an output current to a voltage bus, the method comprising:

monitoring input voltage and input current of the power converter;

monitoring the output voltage and the output current of the power converter;

regulating the input voltage of the power converter according to a Maximum Power Point Tracking (MPPT) algorithm using parameters corresponding to:

the monitored input voltage and monitored input current of the power converter; and the monitored output voltage and output current of the power converter; and regulating output power of the power converter, comprising:

deliberately allowing changes in the output voltage of the power converter to move the input voltage of the power converter away from a maximum power point (MPP) voltage value corresponding to an MPP of the solar panel, and creating localized power gradients of a characteristic of output power of the power converter versus an overall bus voltage, wherein the power gradient compels an inverter coupled to the voltage bus and performing MPPT to track an overall bus voltage of the voltage bus and maintain the overall bus voltage within a specified preferred range;

tracking, over a time period of specific duration, minimum voltage output values and maximum voltage output values for the output voltage of the power converter; and upon expiration of the time period:

identifying a peak minimum voltage output value of the tracked minimum voltage output values and a peak maximum voltage output value of the tracked maximum voltage output values; and controlling a timing and slope of the localized power gradients according to the peak minimum voltage output value and the peak maximum voltage output value.

18. The method of claim 17, wherein said monitoring comprises obtaining digitized values corresponding to the input voltage and input current of the power converter and the output voltage and output current of the power converter, and using the digitized values as the parameters.

19. The method of claim 17, further comprising specifying a point in time at which to enable a corresponding power gradient of the localized power gradients, to regulate the output voltage of the power converter to a particular voltage range.

20. The method of claim 17, wherein said allowing changes in the output voltage comprises moving the input voltage of the power converter in a specific direction independent of a direction of movement of the output voltage of the power converter.

21. The method of claim 17, further comprising:

when the output voltage of the power converter is below a specified first value, creating a power gradient of the localized power gradients that results in an increase in the overall bus voltage;

when the output voltage of the power converter is between the specified first value and a specified second value, maintaining a present output voltage of the power converter; and when the output voltage of the power converter is above the specified second value, creating a power gradient of the localized power gradients that results in a decrease in the overall bus voltage.

22. The method of claim 17, further comprising:

algorithmically determining output threshold values for the output voltage of the power converter;

determining an average value of the output voltage of the power converter over a time period of specific duration;

comparing the average value of the output voltage against the output threshold values; and controlling a timing and a slope of a corresponding power gradient of the localized power gradients according to results of said comparing to provide hysteretic control of the power gradient.

23. The method of claim 22, further comprising:

activating a first state upon the average value of the output voltage rising above a highest threshold of the output threshold values, and maintaining the first state until the first state is released;

releasing the first state upon the average value of the output voltage falling below a middle lower threshold of the output threshold values;

activating a second state upon the average value of the output voltage falling below a lowest threshold of the output threshold values, and maintaining the second state until the second state is released; and releasing the second state upon the average value of the output voltage rising above a middle upper threshold of the output threshold values.

24. The method of claim 23, further comprising:

presenting a negative power versus output voltage gradient to the voltage bus when the first state is active and the output voltage becomes greater than the average value of the output voltage; and presenting a positive power versus output voltage gradient to the voltage bus when the second state is active and the output voltage becomes lower than the average value of the output voltage.

25. The method of claim 17, wherein said regulating the output power of the power converter comprises regulating the output power of the power converter according to a specified function that provides a mapping between the output voltage of the power converter and the input voltage of the power converter.

26. The method of claim 25, wherein the specified function is nonlinear, wherein said regulating the power converter according to the specified function comprises:

initiating a negative power gradient to be presented to the voltage bus for a period of time when the output voltage is above a specified first threshold;

releasing the negative power gradient when the output voltage falls below a specified second threshold;

initiating a positive power gradient to be presented to the voltage bus for a period of time when the output voltage is below a specified third threshold; and releasing the positive power gradient when the output voltage rises above a specified fourth threshold.

27. The method of claim 26, wherein the first, second, third, and fourth thresholds are specified to have values that provide hysteresis for said initiating the positive power gradient and negative power gradient, and said releasing the positive power gradient and negative power gradient.

28. A converter unit comprising:
a power converter having an input configured to couple to a solar panel to obtain an input voltage and input current from the solar panel, and an output configured to couple to a voltage bus to provide a converter output voltage and a converter output current to the voltage bus; and
a control unit comprising:
one or more input ports configured to receive a plurality of parameters comprising:
a first parameter indicative of an input current of the power converter;
a second parameter indicative of an input voltage of the power converter;
a third parameter indicative of the converter output voltage; and
a fourth parameter indicative of the converter output current; and
a controller configured to:
implement a Maximum Power Point Tracking (MPPT) algorithm using the first, second, third, and fourth parameters as input values, to regulate the input voltage, input current, output voltage, and output current of the power converter;
deliberately allow changes in the output voltage of the power converter to move the input voltage of the power converter away from a maximum power point (MPP) voltage value corresponding to an MPP of the solar panel, and create localized power gradients of a characteristic of output power of the power converter versus an overall voltage on the voltage bus, wherein the localized power gradients allow tracking to a specified value of the overall voltage on the voltage bus, for maximum power transfer over the voltage bus;
track, over a time period of specific duration, minimum voltage output values and maximum voltage output values for the output voltage of the power converter; and
upon expiration of the time period:
identify a peak minimum voltage output value of the tracked minimum voltage output values and a peak maximum voltage output value of the tracked maximum voltage output values; and
control a timing and slope of the localized power gradients according to the peak minimum voltage output value and the peak maximum voltage output value.

29. The converter unit of claim 28, wherein the controller is configured to implement a mapping of the converter output voltage to the input voltage by mapping a triangular probe waveform seen at the output of the converter unit onto a square wave seen at the input of the converter unit.

30. The converter unit of claim 29, wherein the mapping is nonlinear and is discontinuous, wherein in implementing the power curve shaping algorithm, the controller is configured to:

initiate a negative power gradient to be presented to the voltage bus for a period of time when the output voltage is above a specified first threshold;
release the negative power gradient when the output voltage falls below a specified second threshold;
initiate a positive power gradient to be presented to the voltage bus for a period of time when the output voltage is below a specified third threshold; and
release the positive power gradient when the output voltage rises above a specified fourth threshold.

31. The converter unit of claim 30, wherein the first, second, third, and fourth thresholds are specified to have values that provide hysteresis for initiating the positive power gradient and negative power gradient, and for releasing the positive power gradient and negative power gradient.

32. The converter unit of claim 28, wherein the power converter is a switching DC/DC converter.

33. A system for harnessing photonic energy to provide power to one or more loads, the system comprising:
a plurality of solar power panels, wherein each given solar panel of the plurality of solar panels provides a respective output current and a respective output voltage;
a DC voltage bus providing a DC bus voltage;
a plurality of converter units coupled to the DC voltage bus, each converter unit of the plurality of converter units configured to provide a respective converter output voltage to the DC voltage bus, wherein each given solar panel is coupled to a corresponding converter unit of the plurality of converter units to provide its respective output current and its respective output voltage as inputs to its corresponding converter unit, wherein each corresponding converter unit comprises a switching power module that produces a respective converter output voltage and respective converter output current, and wherein each corresponding converter unit is configured to:
regulate an input voltage of its switching power module according to an MPPT (maximum power point tracking) algorithm receiving parameters as inputs, wherein the parameters correspond to one or more of:
the input voltage and input current of the switching power module; and
the respective converter output voltage, and the respective converter output current; and
regulate the respective converter output voltage according to a function of output power provided by the switching power module with respect to the converter output voltage, wherein according to the function, the corresponding converter unit is configured to deliberately allow changes in the respective converter output voltage to move the input voltage of its switching power module away from a maximum power point (MPP) voltage value corresponding to an MPP of the given solar panel, and create localized power gradients of a characteristic of output power of the respective switching power module versus the DC bus voltage;
track, over a time period of specific duration, minimum voltage output values and maximum voltage output values for the output voltage of the power converter; and
upon expiration of the time period:
identify a peak minimum voltage output value of the tracked minimum voltage output values and a peak maximum voltage output value of the tracked maximum voltage output values; and control a timing and slope of the localized power gradients according to the peak minimum voltage output value and the peak maximum voltage output value; and a DC/AC inverter that performs MPPT and inverts the DC bus voltage to an AC power signal for distribution to one or more AC loads.

34. The system of claim 33, wherein the plurality of converter units are series connected to the DC voltage bus via their respective outputs.

35. The system of claim 33, wherein the plurality of converter units are configured to receive external control signals to set target values for the respective converter output voltages.

* * * * *